United States Patent
Watanabe

(10) Patent No.: US 7,158,249 B2
(45) Date of Patent: Jan. 2, 2007

(54) FACSIMILE APPARATUS AND CONTROL METHOD

(75) Inventor: Naoya Watanabe, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1145 days.

(21) Appl. No.: 10/075,690

(22) Filed: Feb. 13, 2002

(65) Prior Publication Data
US 2002/0122215 A1 Sep. 5, 2002

(30) Foreign Application Priority Data
Feb. 19, 2001 (JP) ............................. 2001-042524

(51) Int. Cl.
G06F 15/00 (2006.01)
H04N 1/00 (2006.01)
H04M 11/00 (2006.01)

(52) U.S. Cl. .................. 358/1.15; 358/403; 358/440; 379/93.17

(58) Field of Classification Search ............... 358/1.15, 358/403, 440; 379/93.17, 93.23
See application file for complete search history.

(56) References Cited

U.S. PATENT DOCUMENTS 5,438,433 A * 8/1995 Reifman et al. ............ 358/468
6,879,411 B1 * 4/2005 Otsuka et al. ............. 358/1.15

FOREIGN PATENT DOCUMENTS

| EP | 0 812 100 A2 | 12/1997 |
| EP | 1 011 261 A2 | 6/2000 |
| EP | 1 033 865 A2 | 9/2000 |

* cited by examiner

Primary Examiner—Jerome Grant
Assistant Examiner—Houshang Safaipour
(74) Attorney, Agent, or Firm—Cowan, Liebowitz & Latman, P.C.

(57) ABSTRACT

A facsimile machine in which multiple items of account information can be registered in an internal memory with the machine being capable of sending and receiving E-mail is disclosed. If the facsimile machine has been instructed to perform an E-mail operation and multiple items of account information has been registered, one of these items of account information is selected and authentication processing is executed. If only one item of account information has been registered, then this account information is used but the authentication processing is omitted. Thus, depending upon the account registration circumstances, an E-mail operation can be performed without performing an account selection operation and/or personal authentication. The result is improved operability.

7 Claims, 24 Drawing Sheets

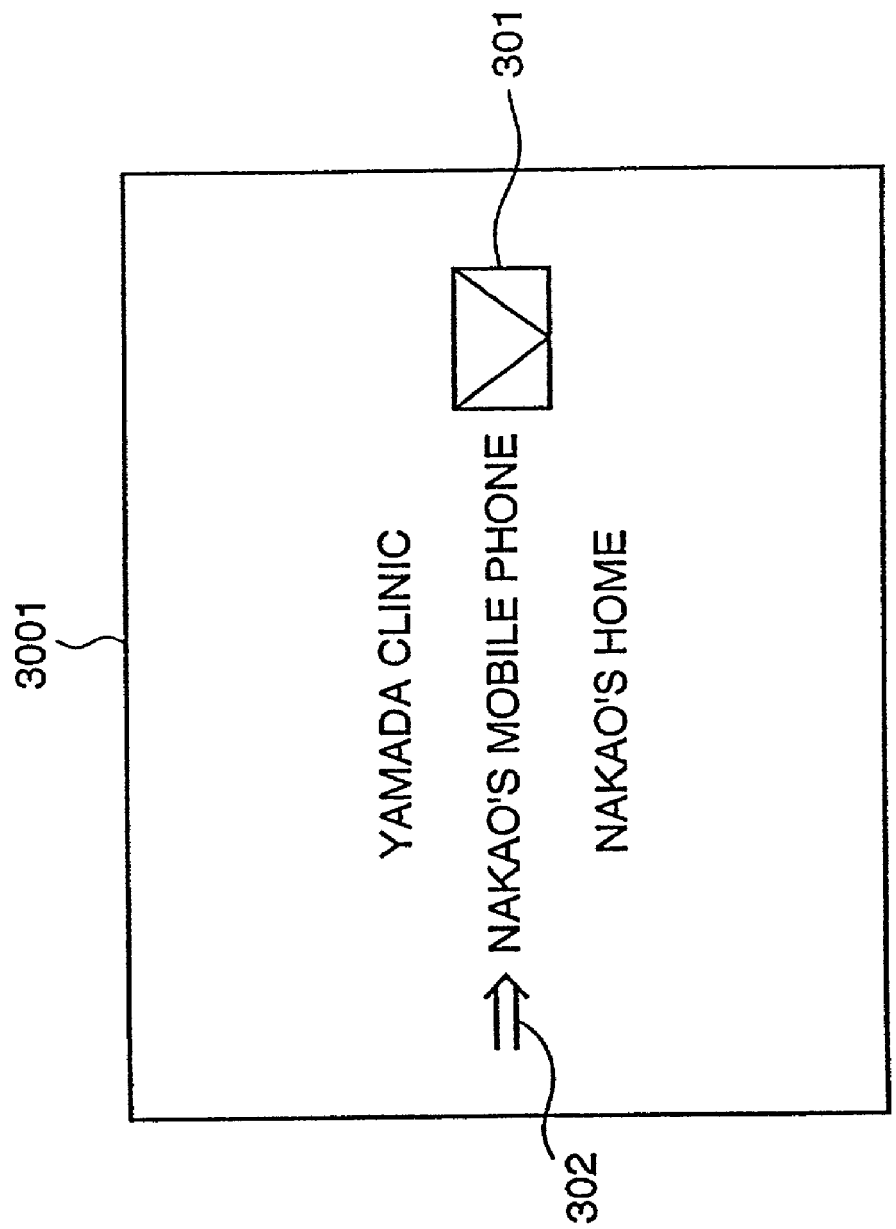

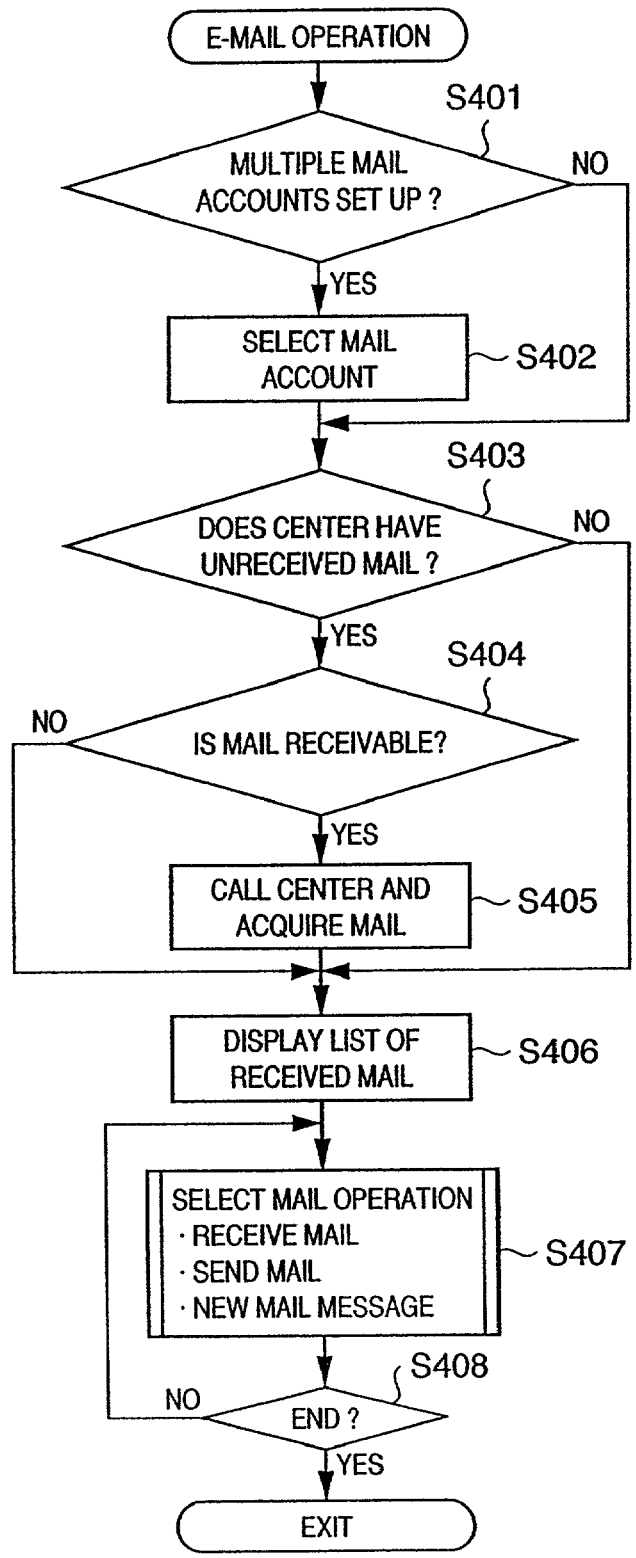

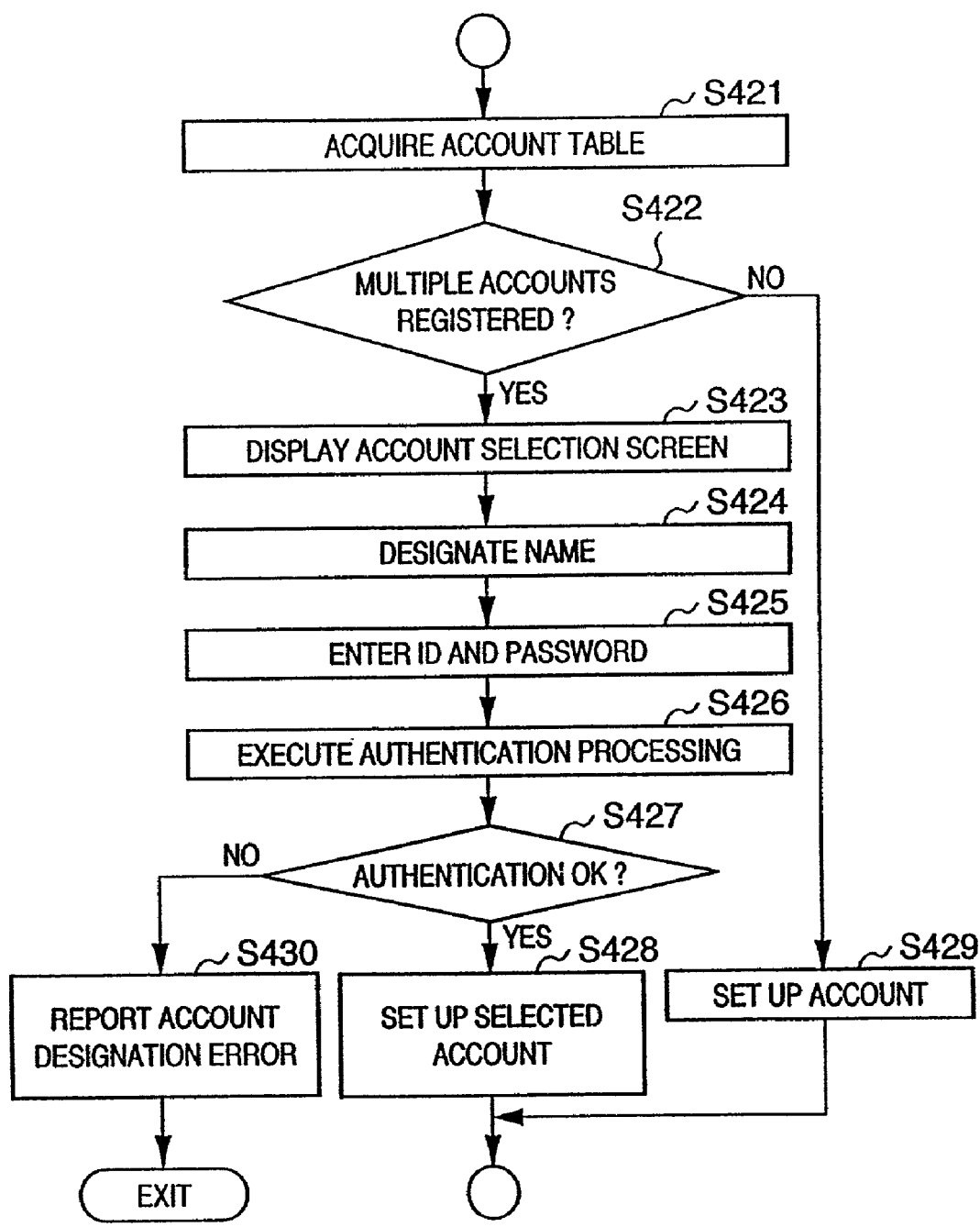

| NAME | ID | PASSWORD | ACOUNT INFORMATION |
|------|----|----------|--------------------|
| 402  | 403 | 404    | 405                |

| 421 | INCOMING MAIL REPORTED | ○ |
|---|---|---|
| 422 | RECEPTION FAILURE | × |

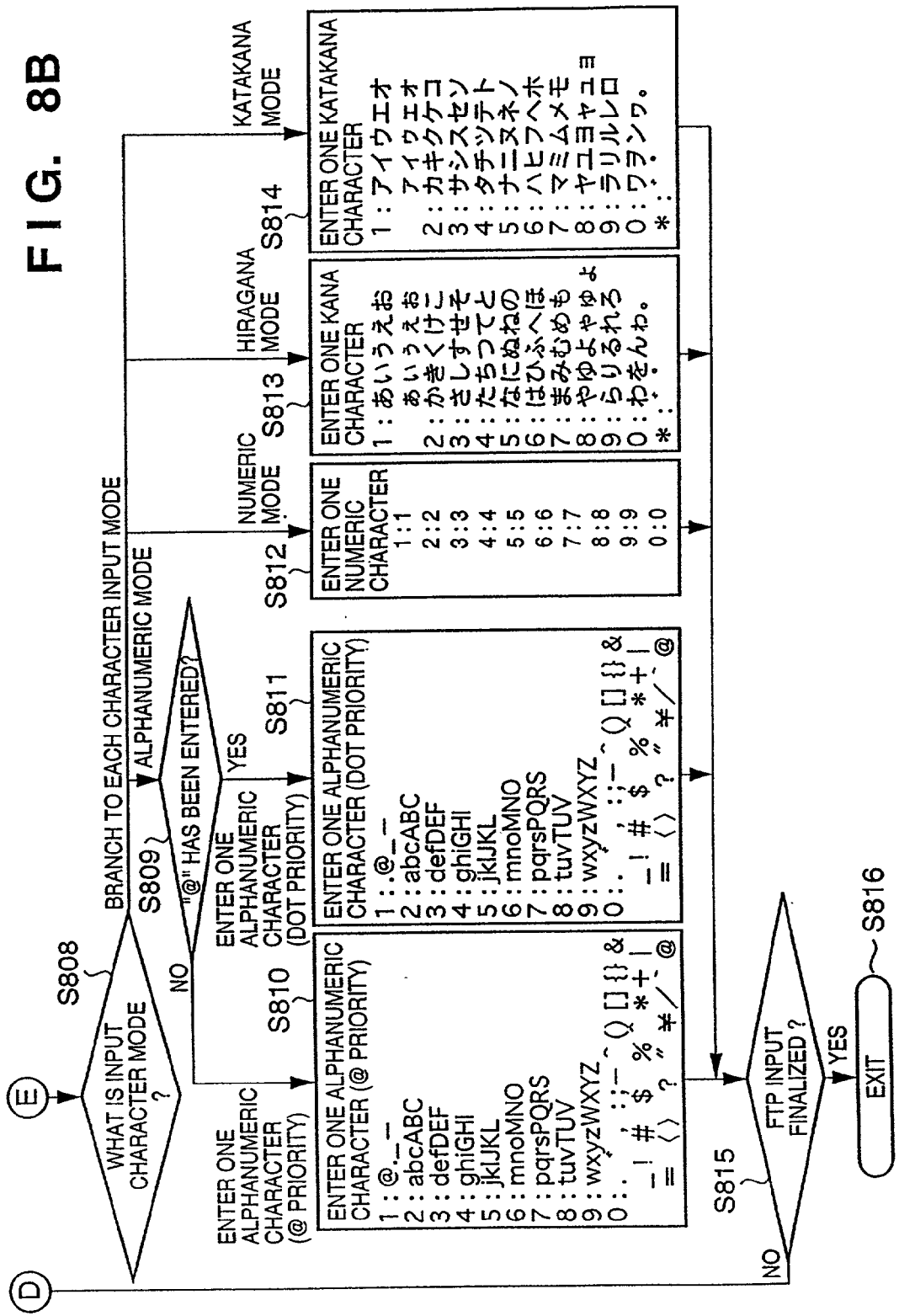

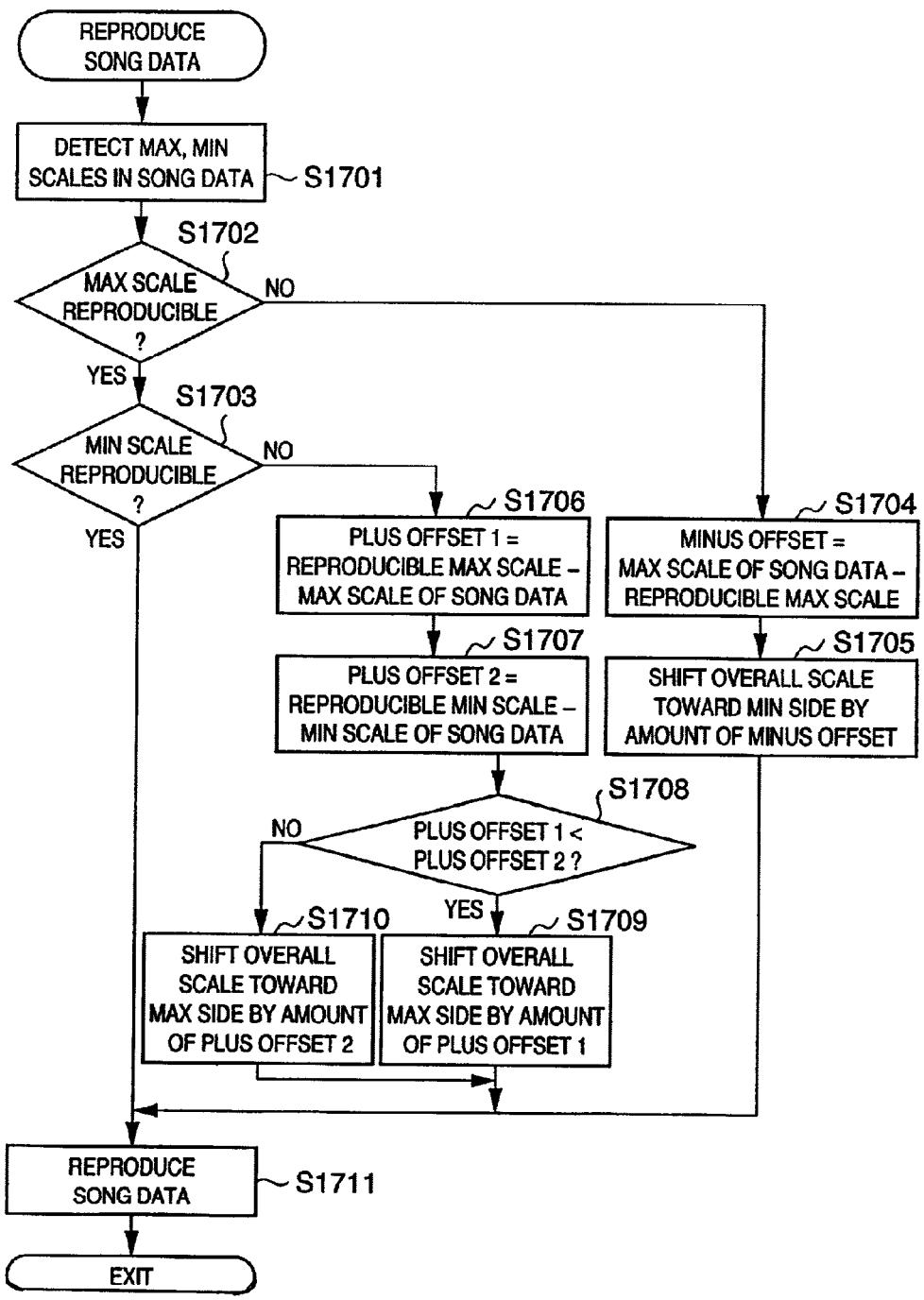

FACSIMILE APPARATUS AND CONTROL METHOD

FIELD OF THE INVENTION

This invention relates to a facsimile apparatus having an electronic-mail function and to a method of controlling a facsimile apparatus having this function.

BACKGROUND OF THE INVENTION

When a number of users share a single terminal in a communication apparatus having an electronic mail (E-mail) function, it is necessary to display a mailbox and E-mail and to manage the operating environment for every user. Various methods of authenticating individual users are known for the purpose of achieving this.

For example, a log-in ID and password for every user are stored beforehand and held in the apparatus. The log-in ID is an ID for specifying a user. When the E-mail function is used, there are instances where the ID is replaced by a mail account. In a well-known method of personal authentication, an input screen is displayed when the E-mail function is used, and the user enters an assigned log-in ID and password to enable use of the E-mail function.

However, if the communication apparatus is so adapted that personal authentication is always required when E-mail is used as in the manner described above, a troublesome input operation for the purpose of personal authentication must be made every time even in a case where a single user and not multiple users employs the communication apparatus and in the case of a user for whom the user-by-user configuration of environment is not required. If there is only a single account, moreover, it is annoying to be compelled to select the account in order to send or receive mail.

SUMMARY OF THE INVENTION

Accordingly, an object of the present invention is to make an account selection operation unnecessary in accordance with account registration circumstances, thereby improving E-mail operability.

According to the present invention, the foregoing object is attained by providing a facsimile apparatus having a facsimile function and an E-mail function, comprising: registration means capable of registering multiple items of account information; deciding means for deciding whether the multiple items of account information have been registered in the registration means when the use of the E-mail function is directed by a user; selection means for selecting one item of account information of the plurality thereof if the deciding means decides that the multiple items of account information have been registered in the registration means; setting means for setting up an account based upon one item of account information if only one item of account information has been registered in the registration means, and based upon an item of account information selected by the selection means if multiple items of account information have been registered in the registration means; and processing means for executing processing related to E-mail using the account set up by the setting means.

According to the present invention, the foregoing object is attained by providing a facsimile apparatus control method for controlling a facsimile apparatus having a facsimile function and an E-mail function, comprising: a registration step of registering at least one account information in registration means capable of registering multiple items of account information; a deciding step of deciding whether the multiple items of account information have been registered in the registration means when the use of the E-mail function is directed by a user; a selection step of selecting one item of account information of the plurality thereof if the deciding means decides that the multiple items of account information have been registered in the registration means; a setting step of setting up an account based upon one item of account information if only one item of account information has been registered in the registration means, and based upon an item of account information selected at the selection step if multiple items of account information have been registered in the registration means; and a processing step of executing processing related to E-mail using the account set up at the setting step.

Another object of the present invention is to so arrange it that E-mail can be used without performing personal authentication under certain conditions, thereby improving E-mail operability.

Further, it is so arranged that in the registering of account information, a name is registered in association with each item of account information, and it is so arranged that a desired item of account information can be selected by specifying the corresponding name. This makes it possible to designate desired account information more intuitively. Furthermore, it is so arranged that a list of registered names is displayed so that a desired name may be selected from the list. This enhances operability.

Further, authentication information is registered in association with each item of account information, and authentication based upon the authentication information is performed with regard to selected account information. This makes it possible to maintain security even if there are multiple users. In addition, if there is only a single account, the labor involved in performing authentication is eliminated. The result is improved operability. Further, if authentication information possessed by account information is exploited as authentication information, then it will no longer be necessary for a user to memorize an unnecessarily large quantity of authentication information. This also enhances operability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 3B is a diagram illustrating an example of a display of search results based upon an address search in FIG. 3A;

FIG. 4A is a flowchart illustrating overall processing for an E-mail operation according to the embodiment;

FIG. 4B is a flowchart illustrating processing for setting an account according to the embodiment;

FIG. 4C is a diagram illustrating an example of the structure of data in an account table according to this embodiment;

FIG. 4E is a diagram useful in describing unreceived-mail information according to this embodiment;

FIGS. 8A and 8B are flowcharts illustrating processing for entering text according to this embodiment;

FIG. 17 is a flowchart useful in describing processing for reproducing song data according to this embodiment.

DESCRIPTION OF THE PREFERRED EMBODIMENT

A preferred embodiment of the present invention will now be described in detail with reference to the accompanying drawings.

<1. Facsimile Machine Structure>

Figure 1:
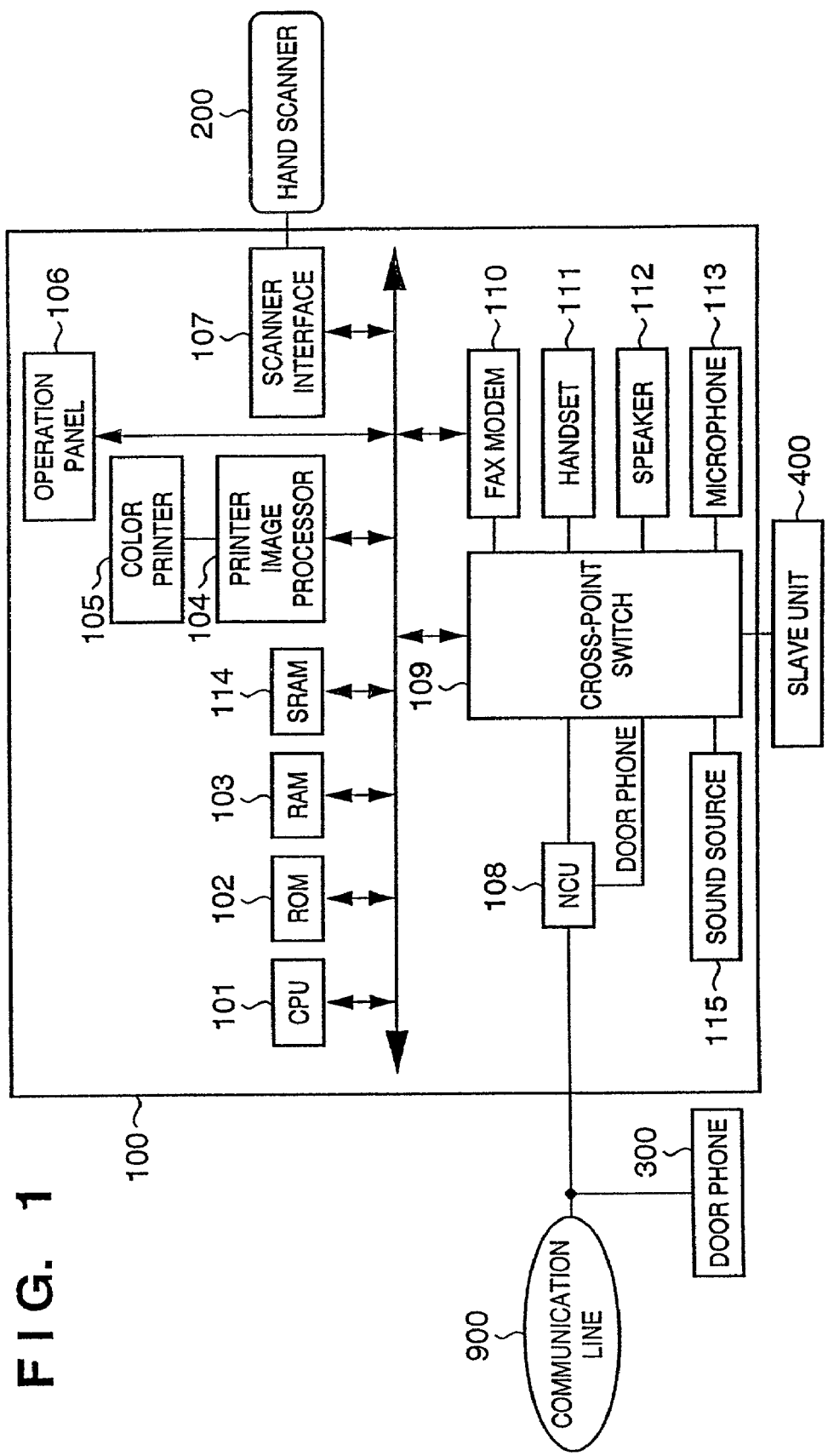
FIG. 1 is a system block diagram of a communication apparatus according to an embodiment of the present invention.

FIG. 1 is a block diagram illustrating the structure of a facsimile machine 100. The facsimile machine 100 includes a first central controller (CPU) 101, a ROM 102 storing a program for controlling communication and printing, and a RAM 103 used for storing various data such as data representing images, voice, E-mail and an alert melody, and as a general work area.

An SRAM 114 holds various registration data. The SRAM 114 is backed up by a battery (not shown) so that content of the memory will be preserved when power is turned off.

A printer image processor 104 applies various image processing to various data such as image data and E-mail to be printed, outputs the processed data to a color printer 105 and causes the printer to print the data. The printer image processor 104 executes processing for converting various data, which is held by the facsimile machine, to printer resolution, and transmits print data that has undergone the resolution conversion to the color printer 105.

The color printer 105 outputs a facsimile image, E-mail messages and attached images and copied images received from the printer image processor 104.

An operation panel 106 is constituted by a key input unit used when a dialing operation and various settings performed, and a display unit for displaying various data. By way of example, a liquid crystal display device may be used as the display unit.

A scanner interface 107 is constituted by a connector for attaching a hand scanner 200 and a data transceiver register. A cross-point switch 109 is for changing over the connections of an analog signal path by control exercised by the CPU 101. A modem 110 functions to receive facsimile signals and to modulate images read by the scanner and various control signals to analog signals. The apparatus further includes a handset 111, a speaker 112, a microphone 113, an NCU 108, which is a communication line interface, and a sound source 115 capable of multiplexing and outputting frequency-modulated signals. The sound source 115 outputs a predetermined melody via the speaker 112 when an incoming call arrives.

A door phone (interphone) 300 is connected externally of the apparatus by a communication line 900. A signal from the communication line 900 and a signal from the door phone 300 are distributed within the facsimile machine 100 by the internal NCU 108 and are connected to a communication-line input/output of the cross-point switch 109 and to door-phone input/output, respectively. A cordless-phone slave unit 400 is for outside-line calls and facsimile communication via the communication line 900 and for conversations on an inside line using the handset of the apparatus proper.

<2. Telephone Directory>

Figure 2:
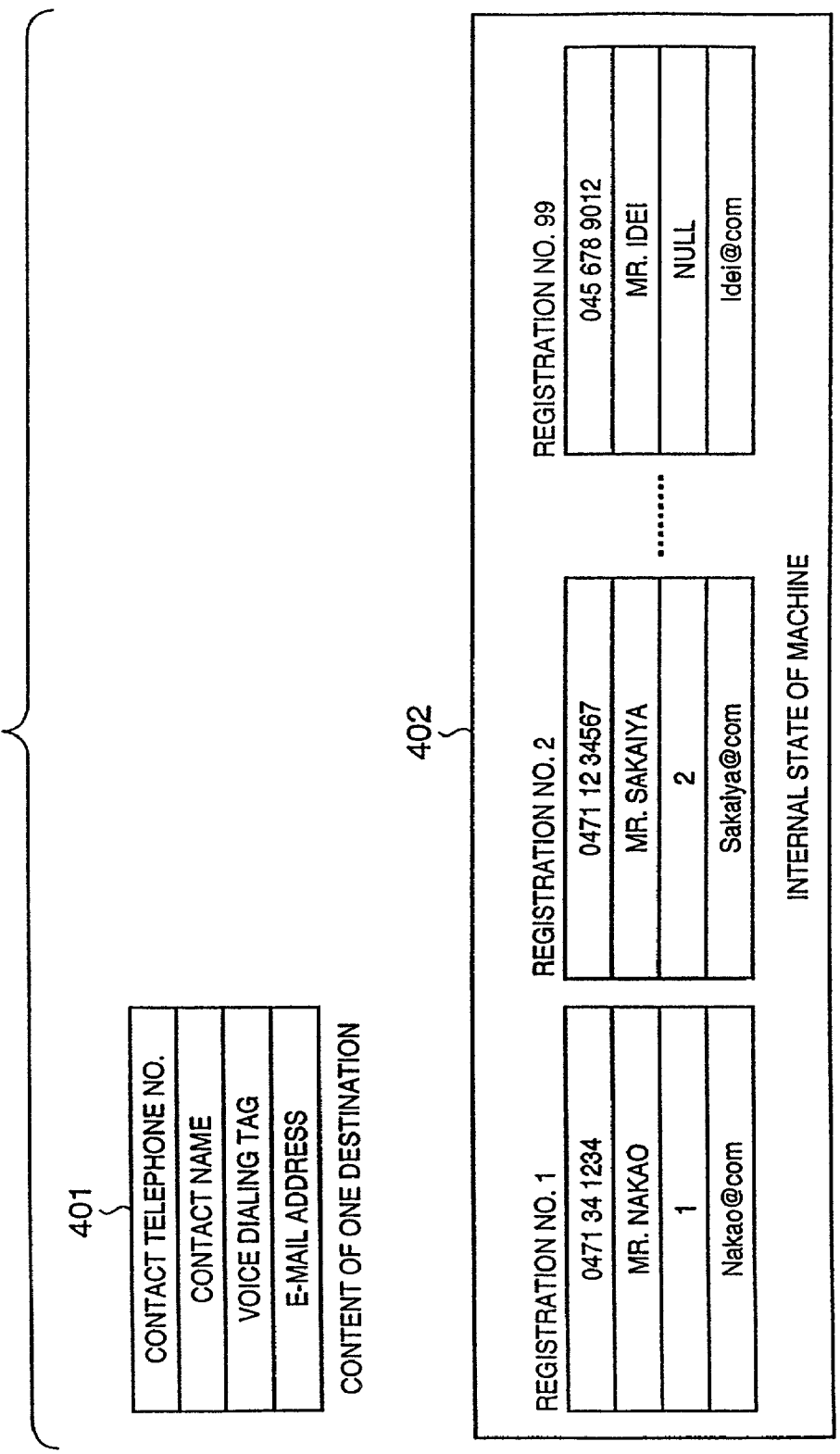
FIG. 2 is a diagram showing the data structure of a telephone directory memory according to the embodiment.

FIG. 2 is a diagram showing the structure of a telephone directory memory in the facsimile machine 100. Numeral 401 denotes an example of the data structure of destination data concerning one contact. The data includes "CONTACT TELEPHONE NO", "CONTACT NAME", "VOICE DIALING TAG" and "E-MAIL ADDRESS" as registered content. In the destination data, numerical-value data indicating the telephone number of the contact is stored under "CONTACT TELEPHONE NO.", the ASCII code of the name of the contact is stored under "CONTACT NAME", and a pointer indicating voice recognition data (referred to as "voice dialing data" below) used when dialing by voice recognition is performed is stored under "VOICE DIALING TAG". In this embodiment, the storage number of voice dialing data that has been stored in a separate memory is registered as the "VOICE DIALING TAG". Further, the E-mail address of the contact is stored under "E-MAIL ADDRESS". The destination data is stored in the SRAM 114 of the system proper.

Numeral 402 denotes a conceptual representation in a case where telephone directory data is actually stored in the SRAM 114. On the assumption that 100 destinations can be registered in the telephone directory, 100 items of the above-mentioned address data 401 are capable of being stored. For example, "0471341234" has been registered as the contact telephone number and the ASCII code of a "Mr. Nakao" has been registered as the contact name in the destination data of REGISTRATION NO. 1. Further, "1" has been set as the voice dialing tag. Furthermore, an E-mail address has been registered as the "E-MAIL ADDRESS". In the destination data at REGISTRATION NO. 100 in FIG. 2, "NULL" has been registered as the voice dialing log. This indicates that voice recognition data regarding this item of destination data does not exist.

When a user wishes to register destination data in the telephone directory, the user performs a directory registration operation using the operation panel 106 of FIG. 1, whereby a directory registration operation begins.

In the operation for registering a contact telephone number, the user enters the telephone number of the contact by pressing keys on the operation panel 106. The entered content is saved in the portion of the registration data 401 corresponding to the contact telephone number. Next, the user enters the name of the contact by pressing the keys on the operation panel 106. This content is saved in the contact name portion of the registration data 401. Finally, the user registers voice data for dialing the presently registered contact by voice recognition.

According to this embodiment, use is made of a specific-speaker recognition method in which voice entered from a voice input unit is registered and voice recognition is performed using this voice. Such a technique is well known in the art and need not be described here.

Voice dialing tags for managing multiple items of voice data are assigned and registered. The number of a voice dialing tag assigned to an item of voice data corresponds to the voice dialing tag portion of the registration data 401. Entry of an E-mail address in the registration data 401 is performed through a method similar to that used to enter the name of a contact. The entry of an E-mail address is by alphanumeric characters.

<3. E-mail Transmission Processing>

Described next will be processing for a case where the user, after having registered the above-mentioned destination data in the telephone directory memory, sends mail by voice recognition to a contact whose E-mail address has been registered in the telephone directory memory.

In the facsimile machine according to this embodiment, there are two methods through which E-mail is transmitted using voice recognition.

The first method includes searching the telephone directory using voice recognition, displaying whether or not an E-mail address has been registered in the retrieved destination data of a contact, and allowing the user to decide whether to create and send E-mail to this contact or originate a telephone call to this contact. If the user has selected creation and transmission of E-mail in this method, then the mailer for E-mail is opened and the E-mail address that is associated with the contact retrieved as a result of voice recognition is set automatically as the destination of the transmission. If the user has selected to originate a telephone call, on the other hand, then call originating processing is executed to call the telephone number associated with the retrieved contact. The details of this processing will be described later with reference to FIGS. 3A and 3B.

The second method is for when a new mail message is to be created and includes opening the mailer for E-mail and then retrieving the destination address of the new message from the telephone directory using voice recognition, thereby to enter the destination address. In the second method, processing for creating mail is executed with regard to a contact who has an E-mail address. Accordingly, the arrangement is such that when a contact is retrieved from the telephone directory by voice recognition, priority is given to retrieval of contacts having E-mail addresses. Alternatively, the scope of a search based upon voice recognition may be made solely those contacts who have E-mail addresses. The reason for the latter is that limiting the scope of the search raises the speed of search processing.

Thus, according to this embodiment, when a contact is retrieved from the telephone directory by voice recognition, the processing method used to search the telephone directory by voice recognition can be changed depending upon whether the search is conducted when the apparatus is in the usual operating state (the first method) or when a destination is to be entered for a new mail message (the second method). (With the second method, contact destinations having E-mail addresses are retrieved preferentially.)

[3-1. Mail Creation and Transmission by the First method]

Figure 3A:
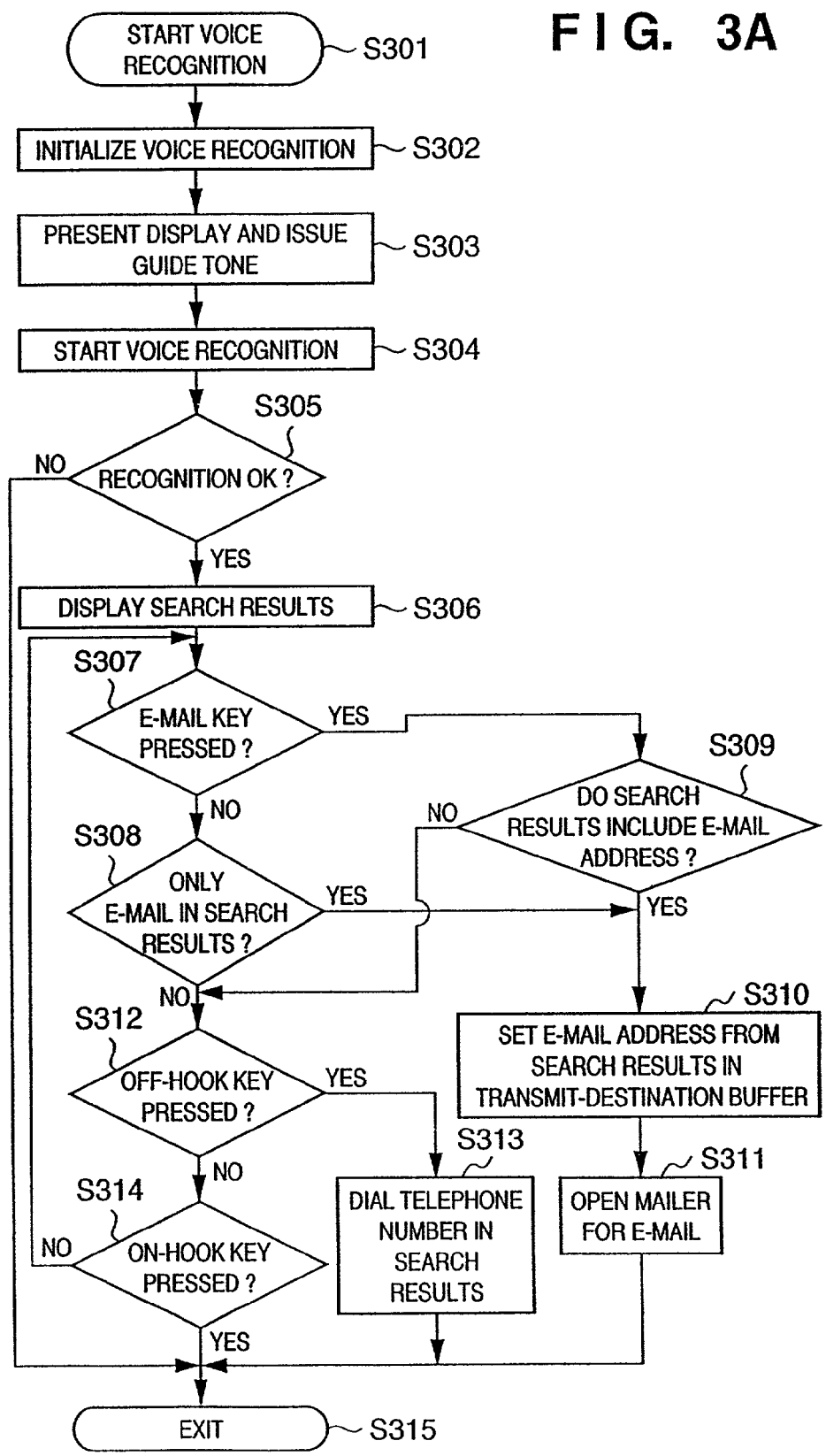
FIG. 3A is a flowchart illustrating address retrieval based upon voice recognition according to the embodiment.

FIG. 3A is a flowchart for describing the procedure of mail transmission processing according to the first method. The processing described below is implemented by having the CPU 101 execute a control program that has been stored in the ROM 102.

Voice recognition processing is started at step S301. Voice recognition processing is started using an input from keys on the operation panel 106 as a trigger. Initialization of a soft variable and initialization of a voice recognition engine of cross-point switch 109 in FIG. 1 (initialization of a global variable and setting of the cross-point switch and A/D converter of the CPU, etc.) is carried out at step S302. Next, at step S303, a display prompting the user to perform a voice recognition operation is presented on an LCD (not shown and referred to as a "display unit" below) of the operation panel 106. At the same time, a guidance tone prompting the user to perform the voice recognition operation is issued from the speaker 112 in FIG. 1.

This is followed by step S304, at which the voice recognition engine is started up to begin recognition of the user's voice entered from the microphone 113. Since voice recognition processing is well known, the details thereof need not be described. An outline of this processing, however, is as follows: The entered voice is converted to digital data, the digital data is compared with already stored voice data for recognition purposes, and the degree of similarity between the two is found. If maximum degree of similarity is greater than a predetermined value, it is judged that voice recognition has been performed normally and the voice dialing tag that corresponds to the recognition voice data having the highest degree of similarity is acquired.

It is determined at step S305 whether voice recognition was performed normally. If the decision rendered is "YES", control proceeds to step S306. If the decision rendered is "NO", on the other hand, then processing for voice recognition is exited from step S305 (step S315).

If voice recognition could be performed normally, then search results are displayed at step S306. In the displaying of search results, the telephone directory memory is searched from the voice dialing tag acquired in voice recognition performed at step S304 and a contact name that has been set in the retrieved destination data is displayed. If an E-mail address has been set in the retrieved destination data, then an E-mail symbol is displayed in addition to the contact name. FIG. 3B is a diagram illustrating an example of a display of search results obtained at step S306. Here a search-result display 3001 is presented on the display unit of the operation panel 106. The search-result display 3001 displays a list of contact names from the telephone directory as well as a cursor 302 alongside the contact name of destination data specified by voice recognition. Furthermore, an E-mail symbol 301 that indicates whether an E-mail address has been set is displayed along with the search results. Thus, by observing the search-result display 3001, the user can ascertain whether an E-mail address has been registered in association with the name of the contact.

Next, at step S307, it is determined whether an E-mail key (not shown) provided on the operation panel 106 has been pressed. If the E-mail key has been pressed ("YES" at step S307), then control proceeds to an operation (step S309) for sending E-mail to the E-mail address that has been retrieved by voice recognition. If the E-mail key has not been pressed ("NO" at step S307), then control proceeds to step S308.

If is found at step S307 that the E-mail key has not been pressed and, moreover, it is determined at step S308 that only an E-mail address and not a telephone number has been registered in the destination data retrieved by voice recognition ("NO" at step S308), then control proceeds to step S310 automatically even though the user has not pressed the E-mail key. As a result, processing for creating and sending mail begins.

If is found at step S307 that the E-mail key has been pressed, then it is determined at step S309 whether the destination data retrieved by voice recognition includes an E-mail address. If it does not ("NO" at step S309), control proceeds to step S312. If the destination data does include an E-mail address ("YES" at step S309), then control proceeds to step S310. Here the E-mail address in the search results is set automatically in a transmit-destination buffer of the E-mail mailer. The mailer is then opened at step S311. With the destination having been set, the mailer waits for the user to perform an operation for creating/sending E-mail. The flow of voice recognition is then exited (step S315).

In a case where destination data retrieved at step S308 is not only an E-mail address ("NO" at step S308), or in a case where an E-mail address is not included in the retrieved destination data even though the E-mail key has been pressed, control proceeds to step S312.

Processing for making a transition to origination of a telephone call following retrieval by voice recognition is executed at step S312. Specifically, if it is found here that an off-hook key has been pressed, control proceeds to step S313, where the telephone number registered for the contact telephone number in the destination data of the search results is dialed to originate a call. The flow of voice recognition is then exited.

If it is found at step S312 that the off-hook key has not been pressed ("NO" at step S312), then it is determined at step S314 whether an on-hook key has been pressed. If the on-hook key has not been pressed ("NO" at step S314), then control returns to step S307 and processing from step S307 is repeated, as a result of which the apparatus waits for depression of the E-mail key, off-hook key or on-hook key. If it is found that the on-hook key has been pressed ("YES" at step S314), then control proceeds to step S315 and the flow of voice recognition is terminated.

In accordance with the procedure set forth above, the mailer is launched and the mail address of a contact is set merely by designating the contact by voice in the creation and transmission of a new mail message. As a result, when a new mail message is created and sent, the user need not take the trouble to launch the mailer and enter a destination address every time.

[3-2. Mail Creation and Transmission by the Second Method]

According to the second method, the mailer for E-mail is opened in order to create a new mail message, the destination of the mail is retrieved from the telephone directory by voice recognition, and the destination is set. This processing is executed in a "NEW MAIL MESSAGE" operation, which is one mailing operation, described later. The details of this processing will be set forth later with reference particularly to FIGS. 8 and 9 in the description of E-mail operation below.

<4. E-mail Operation>

E-mail processing in the facsimile machine according to this embodiment will now be described. The E-mail processing set forth below includes a manual E-mail operation and processing for receiving E-mail automatically. The manual E-mail operation further includes an operation for receiving mail, an operation for sending mail and an operation for new mail messages.

First, reference will be had to the flowchart of FIG. 4A to describe the overall operation of the E-mail function. Control indicated by the multiple flowcharts described below is implemented by having the CPU 101 execute control programs stored in the ROM 102.

[Overview of Manual E-mail Operation]

FIG. 4A is a flowchart useful in describing the E-mail operation according to this embodiment.

The facsimile machine according to this embodiment is characterized in that, depending upon the environment in which it is used, as in the home, the machine is employed by a number of individuals and is capable of sending and receiving E-mail on a person-by-person basis. Accordingly, the facsimile machine is so adapted as to afford a plurality of mail accounts and to be capable of managing E-mail for each individual mail account.

If an E-mail key provided on the operation panel 106 is pressed when the facsimile machine of this embodiment is in the standby state, a screen for dealing with E-mail is displayed so that various operations relating to E-mail can be carried out. When the E-mail key is pressed, therefore, with the facsimile machine in the standby state, it is determined at step S401 whether a plurality of mail accounts have been set up in the facsimile machine. If only one account has been set up ("NO" at step S401), control proceeds to step S403.

If multiple mail accounts have been set up, on the other hand ("YES" at step S401), control proceeds to step S402, where a mail-account selection screen is displayed on the LCD display unit provided on the operation panel 106. The user selects the desired mail account. An arrangement may be adopted in which each mail account is given a name (e.g., the name of the person using the account) and the desired name is chosen to select the desired mail account. Further, it may be so arranged that when the mail account is selected, personal authentication is made using an ID or password, thereby assuring that only the user of the particular mail account can use the account.

The processing indicated by steps S401, S402 above is conceptual. Processing for setting up an account through steps S401, S402 will be described in further detail with reference to FIGS. 4B and 4C.

First, an account table 401 in which E-mail account information has been configured is acquired at step S421 in FIG. 4B. FIG. 4C is a diagram showing an example of the data structure of the account table 401. Name 402, ID 403 and password 404 serving as authentication information, and account information 405 have been registered in the account table 401. Authentication information necessary when E-mail is actually acquired from an E-mail server is stored in the account information. The account table 401 is held in the SRAM 114.

It is determined at step S422 whether multiple accounts have been registered in the account table 401. If only one account has been registered ("NO" at step S422), the registered account information is used to set an account in order to execute an ensuing E-mail operation (step S429). If a plurality of accounts have been registered in the account table 401 ("YES" at step S429), then control proceeds to step S423 in order that a desired account may be selected from the multiple accounts.

The names of the multiple accounts registered in the account table 401 are displayed in the form of a list at step S423. That is, information that has been registered in the name column 402 of account table 401 is displayed. When the name of the desired account is designated at step S424, a screen for entering an ID and password is displayed at step S425 to prompt the user to enter an ID and password. Then, at step S426, authentication is carried out based upon the designated name and the entered ID and password.

If the result of authentication processing at step S426 is that the user has been authenticated ("YES" at step S427), control proceeds to step S428, where the account information that was designated at step S424 is set for the purpose of being used in an ensuing E-mail operation. If authentication fails ("NO" at step S427), then a display to this effect (a display indicating an account designation error) is presented at step S430 and processing is exited.

In order to simplify account designation in a situation where the apparatus is for use in the home, for example, the authentication processing of steps S415 to S427 may be deleted. In such case an E-mail operation based upon a desired account becomes possible merely by designating a name. For the purpose of simplifying the user's operation, the password input of the user in the authentication between the facsimile apparatus and a mail center is omitted in the present embodiment. That is, E-mail can be received from a mail center without a password. However, it is needless to say that the input of the password may be required at the reception of E-mail. Further, authentication information such as the ID 403 and password 404 may utilize the authentication information in the account information 405. If the authentication information in the account information 405 is exploited also for an ID and password, this will be convenient because the ID and password entered at step S415 can be utilized as is in the procedure through which the mail center authenticates the user.

With reference again to FIG. 4A, it is determined at step S403 whether mail not yet received remains in the mail center. Various methods of receiving E-mail are conceivable. For example, there is an arrangement in which when E-mail arrives at the mail server, a mail terminal receives the E-mail automatically substantially at the same time (this shall be referred to as an "automatic reception mode" below). In another arrangement, the mail terminal is notified only of the fact that E-mail has arrived. Then, at a time convenient on the side of the mail terminal, the mail is acquired from the mail server (this shall be referred to as an "incoming-mail notification mode" below). In order to determine whether unreceived mail is at the mail server, the fact that unreceived mail is at the mail server is stored internally beforehand when there is notification of incoming mail in the incoming-mail notification mode or when reception of mail fails owing to communication error or a full memory in the automatic reception mode. On the basis of information of the above-mentioned kind, the facsimile machine determines at step S403 whether the mail server has unreceived mail.

If it is determined that there is no unreceived mail, control proceeds from step S403 to step S406. On the other hand, if it is determined that the mail center has unreceived mail ("YES" at step S403), control proceeds to step S404, where it is determined whether the mail is capable of being received. The determination as to whether mail is receivable involves determining whether any of various factors that would account for mail not being receivable have occurred in the apparatus. An example is filling of the available memory to capacity, making it impossible to receive any more mail. Accordingly, if it is determined that mail is receivable ("YES" at step S404), then the mail center is called and the mail is received from the mail center at step S405. On the other hand, if it is determined that mail is not receivable ("NO" at step S404), then control proceeds to step S406.

The processing indicated at steps S403 to S405 will be described in further detail with reference to FIGS. 4D, 4E and FIG. 12.

Figure 4D:
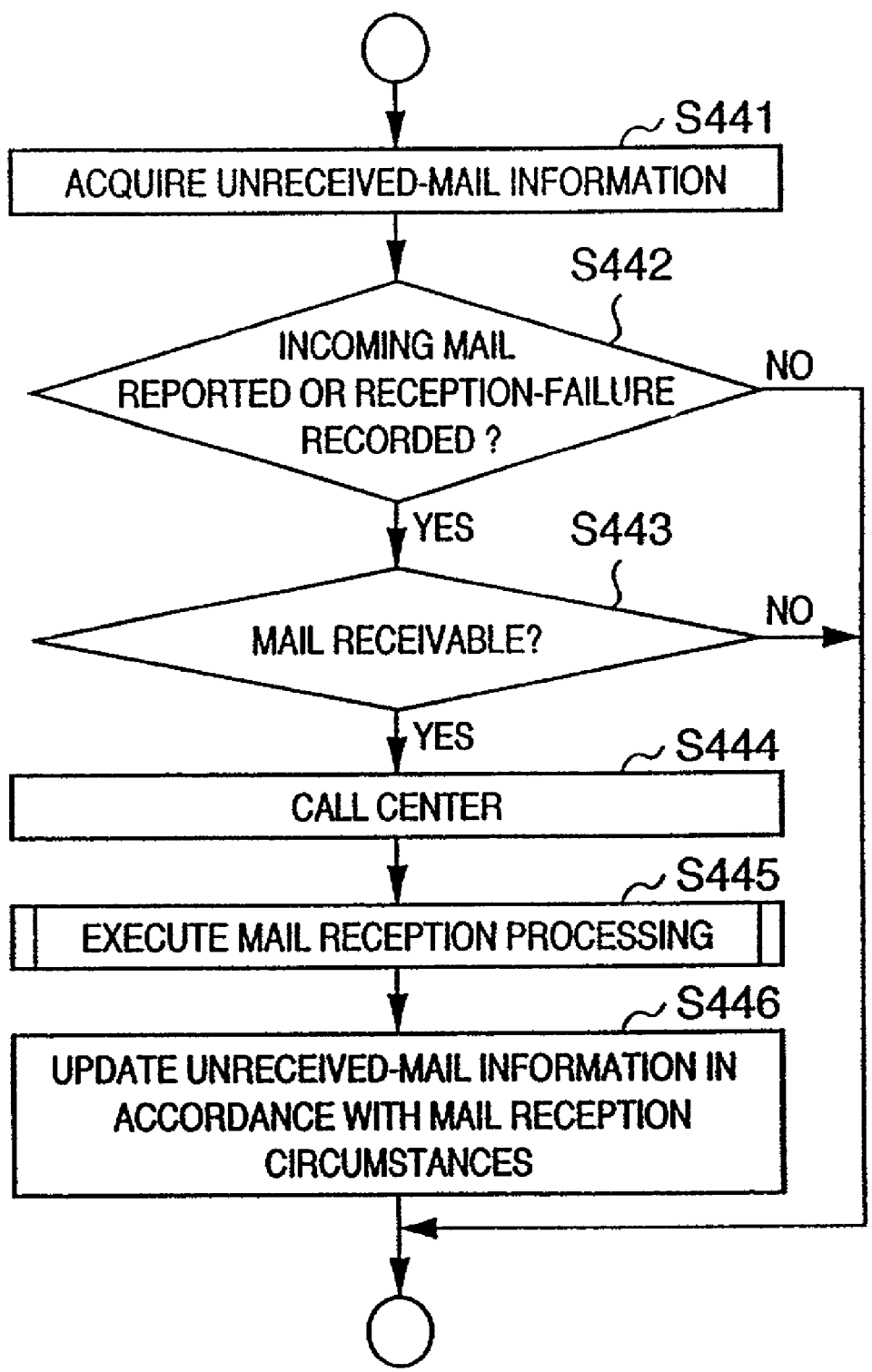
FIG. 4D is a flowchart useful in describing processing for automatically acquiring unreceived mail according to this embodiment.

FIG. 4D is a flowchart useful in describing the details of processing for automatically acquiring unreceived mail. Unreceived-mail information is acquired at step S441. FIG. 4E is a diagram illustrating an example of the data structure of unreceived-mail information 420. The unreceived-mail information is held in the SRAM 114. In FIG. 4E, numeral 421 denotes information as to whether there is notification of incoming mail. In the incoming-mail mode, this information indicates whether the E-mail center has given notification of the arrival of E-mail. Further, numeral 422 denotes information as to whether reception failure has occurred. In E-mail reception processing, this information indicates whether E-mail for which reception failure has occurred exists. In this example, the fact that notification has been given of incoming E-mail or the fact that there is mail for which reception has failed is indicated by "0", and the fact that notification has not been given of incoming E-mail or the fact that there is no mail for which reception has failed is indicated by "X". In the situation illustrated in FIG. 4E, notification has been given of incoming E-mail and there is no mail for which reception has failed. The information 421 as to whether there is notification of incoming mail is effective in the incoming-mail notification mode. It is not necessary to refer to this information in the automatic incoming-mail mode. It goes without saying that if reception of E-mail fails in the automatic incoming-mail mode, the information 422 as to whether reception failure has occurred is set to "0" to indicate that such mail exists.

With reference again to FIG. 4D, it is determined at step S422 whether mail for which the incoming-mail notification has been given or mail for which reception has failed exists. If neither exists ("NO" at step S442), this means that the mail center has no unreceived mail and, hence, the processing of FIG. 4D is exited.

On the other hand, if it is determined that incoming-mail notification has been given or that there is mail for which reception has failed ("YES" at step S442), then control proceeds to step S443. Here it is determined whether or not mail is receivable, as described above in connection with step S404. If mail is receivable on the side of the facsimile machine, then the E-mail center is called at step S444 and the mail is received at step S445 using the account information that was set up at step S428 or S429 in FIG. 4B. Mail reception processing will be described later with reference to FIG. 12.

If mail reception processing is executed at step S445, the information as to whether there is notification of incoming mail is set to "X" to indicate no incoming mail and the information as to whether reception failure has occurred is updated (step S446) in accordance with the circumstances of reception at step S445. That is, if reception of mail fails for even one item of mail in the reception processing of step S445, the information 422 as to whether reception failure has occurred is set to "○" to indicate the occurrence of failure. If all mail has been received normally, then the information 442 is set to "X" to indicate absence of failure.

Figure 12:
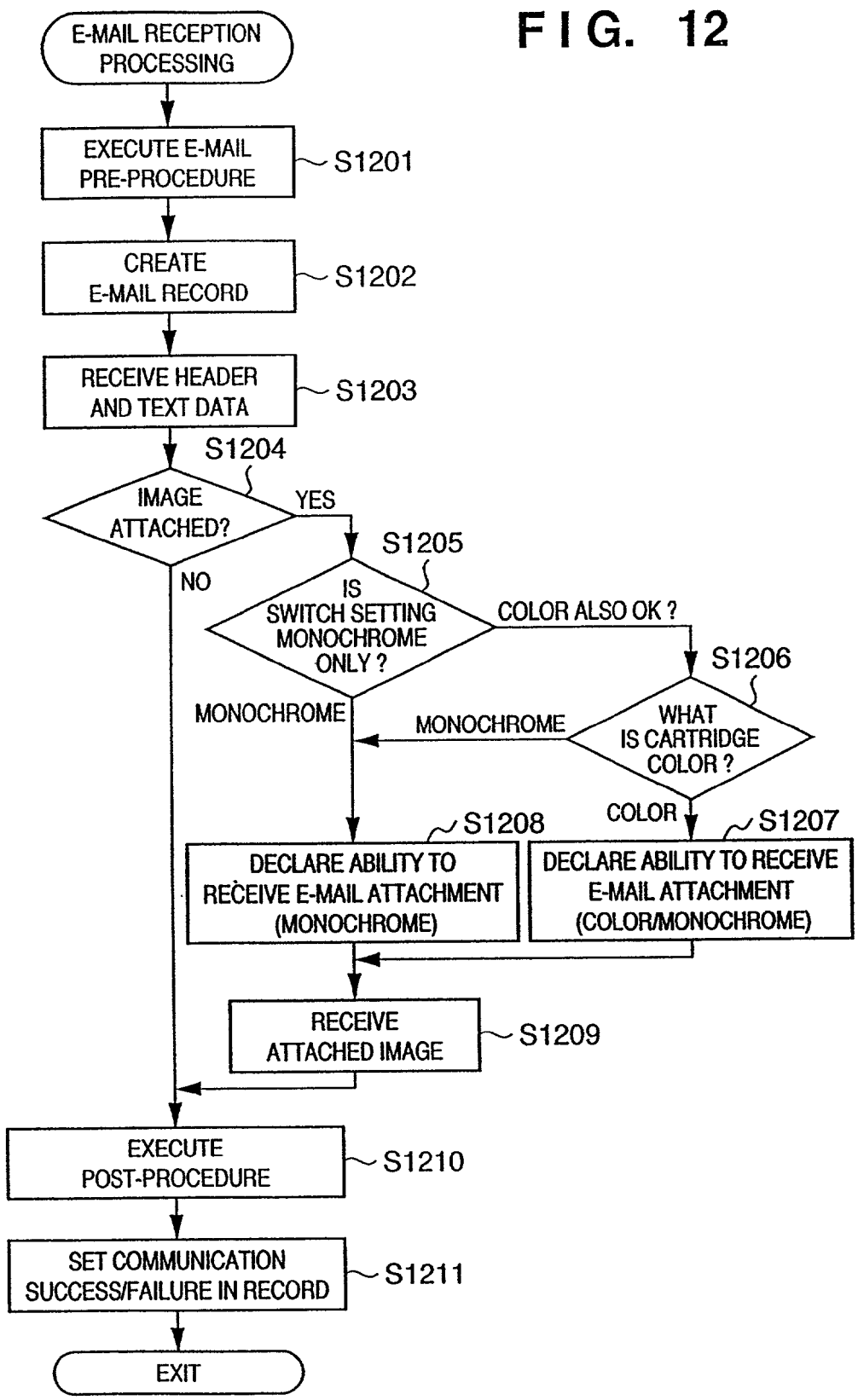
FIG. 12 is a flowchart illustrating processing for receiving E-mail according to this embodiment.

FIG. 12 is a flowchart useful in describing a procedure for receiving E-mail at step S405. This procedure is in accordance with the specifications of individual carriers that provide the E-mail service. Each procedure (protocol) differs depending upon the carrier. However, since the procedure has no direct bearing upon the essence of the present invention, it will be described only in outline.

When the procedure for receiving E-mail starts, a pre-procedure for E-mail is executed (step S1201). At this time the procedure uses a modulation scheme designated by the carrier. Following the success of the E-mail pre-procedure, a mail record for carrying out management of the mail reception data is allocated from the mail memory pool (step S1202).

Header information, which is individual information pertaining to the mail itself, and the data in the main body text of the mail are received from the E-mail server in a predetermined format (step S1203). These items of information are managed in a form linked to the allocated mail record or are stored in the mail record. It is determined at step S1204 whether the mail has an attached image. If it does ("YES" at step S1204), then control proceeds to an attached-image transmission phase (step S1205).

The set state of a soft switch (to select whether the attached image is to be received in color or not) of the facsimile machine is discriminated at step S1205. If the switch has been set to "RECEIVE IN COLOR", the type of printer cartridge (color cartridge or monochrome special-purpose cartridge) is discriminated at step S1206. If it is determined at step S1206 that the cartridge is the color cartridge, then control proceeds to step S1207. Here a declaration is made to the effect that the terminal that receives the image attached to the E-mail has the ability to support both color and monochrome printing.

On the other hand, if it is found at step S1206 that the type of cartridge is the monochrome special-purpose cartridge, then control proceeds to step S1208 even though it was determined at step S1205 that the soft switch of the facsimile machine is set to "RECEIVE IN COLOR". At step S1208 a declaration is made to the effect that the terminal that receives the image attached to the E-mail has the ability to support only monochrome printing. Further, if it was determined at step S1205 that the soft switch of the facsimile machine is not set to "RECEIVE IN COLOR", then control similarly proceeds to step S1208 and a declaration is made to the effect that the terminal that receives the image attached to the E-mail has the ability to support only monochrome printing.

The server side refers to the terminal capability declaration made at step S1208 or S1207. When the attached image is originally a color image, the server executes a procedure in which the image is converted to a monochrome image by color/monochrome conversion means within the mail server in case of monochrome printing, after which the monochrome image is transmitted to the terminal.

Reception of the attached image is performed at step S1209 and then a post-procedure is carried out at step S1210. Further, in accordance with success/failure state of the above procedure, the status of the mail record area is altered. In this embodiment, the specifications are such that a "MAIL SENT" decision is rendered if the transmission of the attached image on the side of the mail server is completed without difficulty. However, detailed management may be performed by splitting the decision between success or failure of transmission of the main body text and success or failure of transmission of the attached image.

If it is determined at step S1204 that there is no attached image, then the post-procedure is implemented at step S1210 and the status of the mail record area is changed at step S1211.

It should be noted that the setting of the soft switch on the facsimile machine at step S1203 generally is set in a case where the user of the terminal wishes to inhibit color printing intentionally. By changing the terminal capability declaration at step S1206 depending upon the type of cartridge, it is possible to perform printing using a monochrome cartridge in the event that a spare color cartridge is not available on the terminal side. This will allow the user to check the content of the attached image. This expedient eliminates the inconvenience of not being able to see the content of an original color image that was received though an user can not observe it in color.

An additional effect in a case where the soft switch is set to inhibit printing in color is that loss of the original color image is prevented. In general, an E-mail service system is such that when communication between the server and a terminal, inclusive of communication of an attached image, is successful, the E-mail is deleted at the convenience of the server or in accordance with the specifications. Execution of deletion differs depending upon the type of carrier or server. What triggers the deletion event is success of the communication between the server and the terminal. On the other hand, if the original image is in color but the image is received upon being converted to a monochrome image, communication between the server and the terminal is rendered unsuccessful forcibly. As a consequence, the E-mail is not deleted and the original attached image is left intentionally on the side of the server. This makes it possible to prevent loss of the original color image.

It should be noted that if communication has been set to unsuccessful at step S1211, the information 422 as to whether reception failure has occurred is set to "○" to indicate failure.

With reference again to FIG. 4A, a list of mail that has been received is displayed in list form on the operation panel 106 at step S406. Control then proceeds to step S407, at which the operation that the user desires is executed. Thus, in the present embodiment as described above, a list of received E-mail is displayed automatically in updated form when an E-mail operation is performed. It may be so arranged that this display of a list of received mail is carried out only if step S405 is executed, i.e., only if new received mail exists, or it may be so arranged that step S406 is eliminated and the list is displayed only in the E-mail operation performed at step S407.

The specific mail operations that are possible in the facsimile machine of this embodiment are "RECEIVE MAIL", "SEND MAIL" and "NEW MAIL MESSAGE". The details of these operations will be described later. Finally, if it is determined at step S408 that the operation has ended (i.e., that quitting of the operation has been directed), then the E-mail operation is terminated.

As mentioned above, mail acquisition processing is executed automatically if unreceived mail exists at the mail center when, with the facsimile machine in the standby state, the E-mail key is pressed to make the transition to the mode in which various E-mail-related operations are carried out. On the other hand, if the contact to which E-mail is to be sent is retrieved from the telephone directory and then the E-mail key is pressed to make a transition to the screen for creating a new mail message, automatic acquisition processing for the acquisition of unreceived mail is not executed.

Thus, the arrangement set forth above is such that when received mail is displayed, it is possible for the mail to be displayed in the state in which the unreceived mail was acquired without the user being aware. If multiple mail accounts have been set up, a transition is made to the mail account selection screen. If only one mail account has been set up, however, the transition to the selection screen is not made. As a result, the operating procedure has fewer steps.

In the flowchart of FIG. 4A, the arrangement is such that unreceived mail is acquired when the E-mail operation is started. However, it may be so arranged that when a transition is made to the mode for various E-mail operations (receive mail, send mail and new mail message) at step S407, the acquisition processing of steps S404, S405 (the details of which are shown in FIG. 4D) is executed only one time. Further, it may be so arranged that the acquisition of unreceived mail is implemented at prescribed time intervals.

The "RECEIVE MAIL" operation, "SEND MAIL" operation and "NEW MAIL MESSAGE" operation, as well as the terminate operation executed at step S408, will now be described.

[4-1. Receive Mail Operation]

Figure 5:
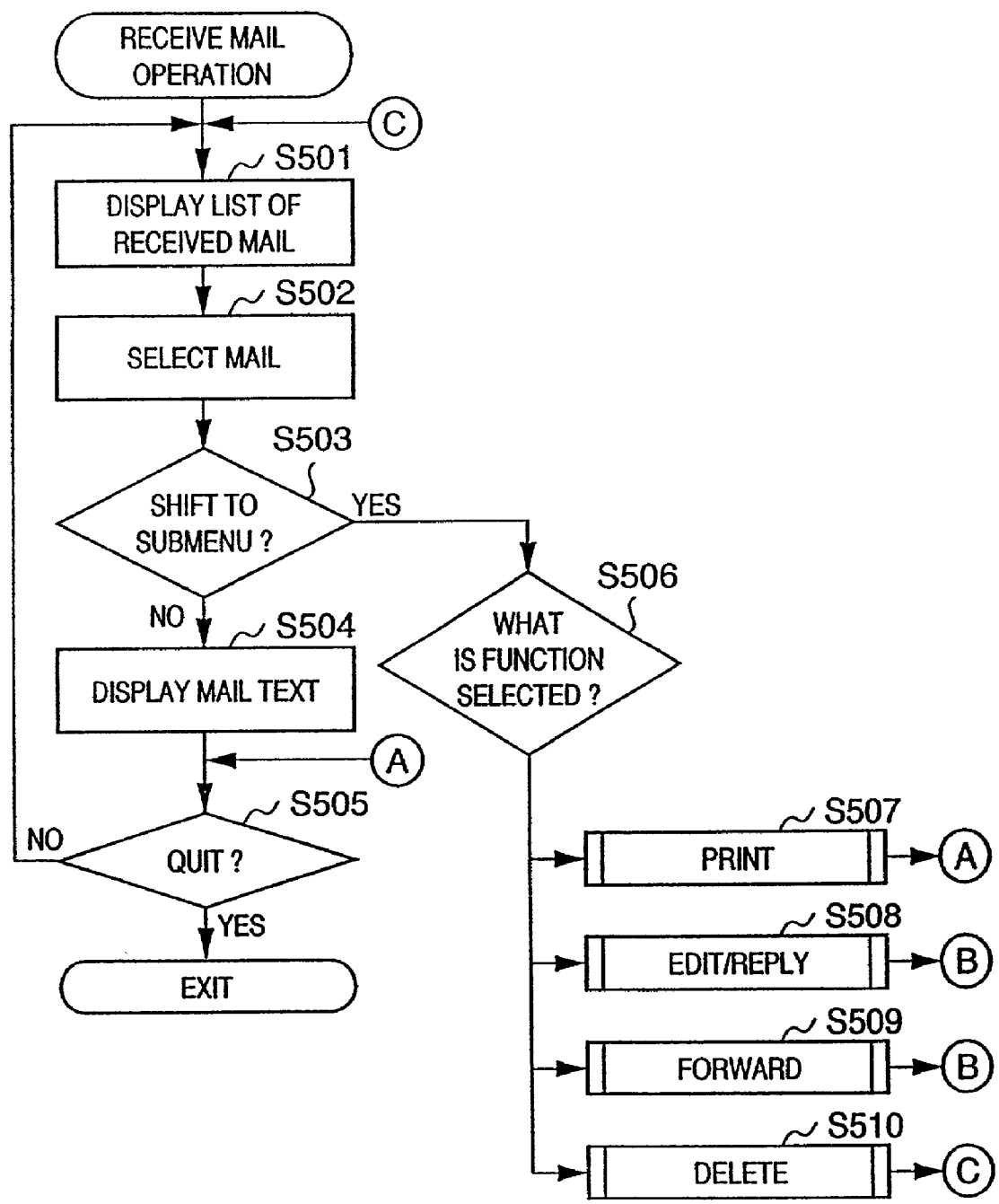
FIG. 5 is a flowchart illustrating processing for a receive-mail operation according to this embodiment.

FIG. 5 is a flowchart illustrating the details of the operation for receiving mail executed at step S407 in FIG. 4.

In the facsimile machine according to this embodiment, the processing shown in FIG. 5 is executed when the "RECEIVE MAIL" operation is selected by the operator as the desired E-mail operation. At step S501 in FIG. 5, a list of already received E-mail is displayed on the display unit LCD of the operation panel 106. The received mail that is desired is then selected from the list at step S502. It is then determined at step S503 whether a function other than perusal has been designated wit respect to the E-mail that was selected at step S502. This embodiment is such that functions other than perusal are placed in a submenu. If a function other tan perusal has been designated, control proceeds to step S506 to make a transition to the submenu. If perusal of the mail is desired ("NO" at step S503) control proceeds to step S504 without a transition being made to the submenu. The text of the received mail selected at step S502 is displayed on the display unit LCD of the operation panel 106 at step S504. If perusal of mail is not quit at step S505, control returns to step S501 to present the list display of the received mail.

If an operation other than perusal is designated at step S503 and the transition is made to the submenu, control proceeds to step S506. Processing branches at step S506 in dependence upon the function designated for the received mail. In the facsimile machine according to this embodiment, "PRINT", "EDIT/REPLY", "FORWARD", "DELETE" of E-mail are included as functions that can be selected.

If "PRINT" has been selected at step S506, the received mail that has been selected is printed out at step S507. Control proceeds to step S505 when printing ends. In a case where the operation to receive mail is terminated as is, the terminate operation is carried out and processing is exited (step S505). If the operation to receive mail is not terminated, then control returns to step S501 to display the list of received mail.

If "EDIT/REPLY" has been selected at step S506, then an editor is started up (step S508) to edit or reply to the received mail that was selected at step S502. (Use is made of processing for creating a new mail message, described later with reference to FIG. 6.) Here the address of the sender of the received E-mail that was selected is set automatically as "DESTINATION" in the processing for creation of a new mail message, the subject of the received mail that was selected is copied to "SUBJECT", and the text of the received mail is copied to "TEXT".

Similarly, if "FORWARD" has been selected at step S506, an editor for forwarding the received mail selected at step S502 is started up and processing for forwarding this received mail is executed (step S509). (Use is made of processing for creating a new mail message, described later with reference to FIG. 6.) In this case, the content of the received mail is used for the subject and text of the mail, and the party to which the mail is forwarded (the destination) is set.

If "DELETE" has been selected at step S506, then the received mail selected at step S502 is deleted from memory. Control then returns to step S501 to display the list of received mail.

[4.2 New Mail Message Operation]

Figure 6A:
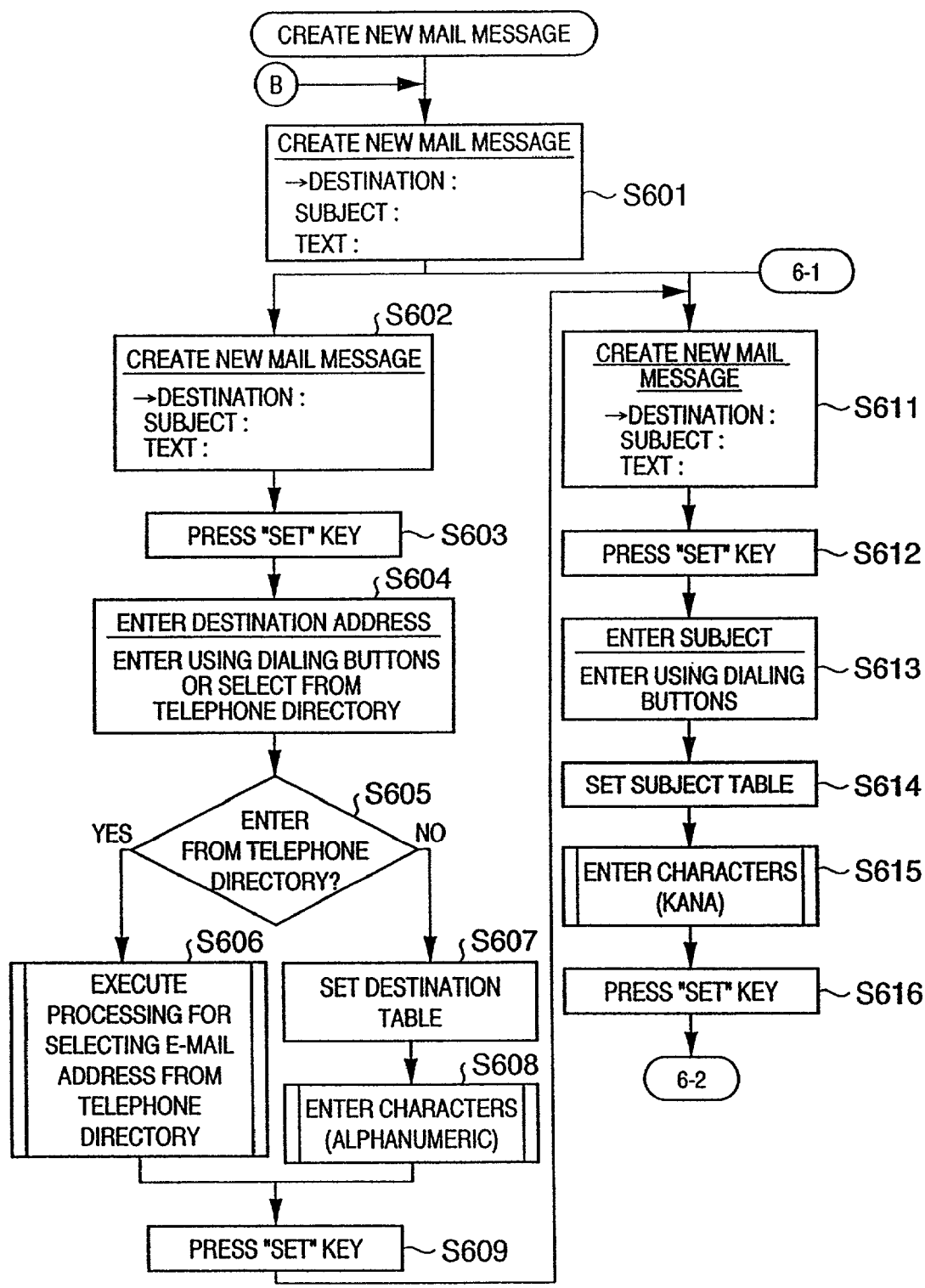
FIG. 6A is a flowchart illustrating processing for a new-mail-message operation according to this embodiment.
Figure 6B:
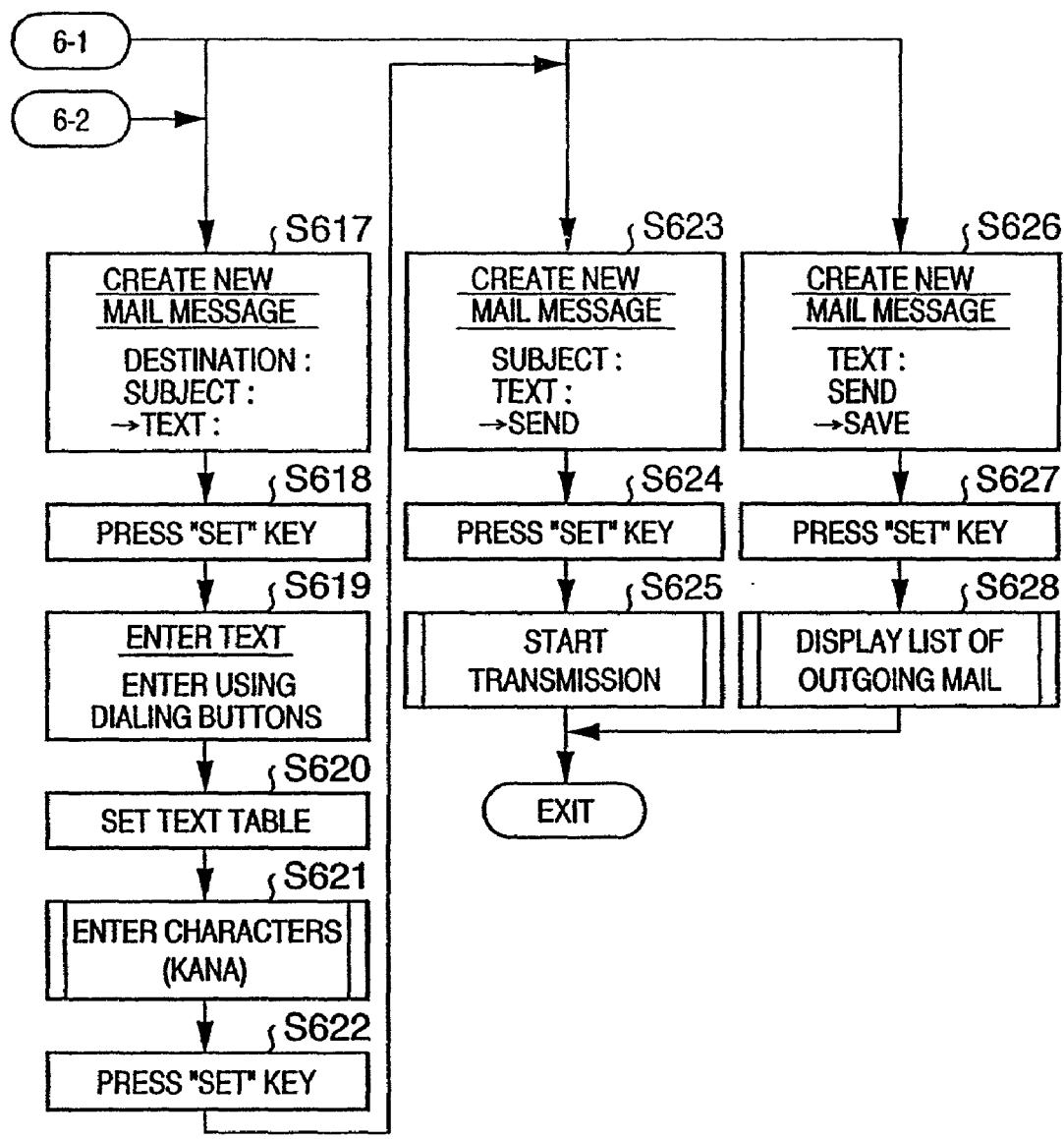
FIG. 6B is a flowchart illustrating processing for a new-mail-message operation according to this embodiment.

FIGS. 6A and 6B are flowcharts useful in describing processing for creating a new mail message through the new mail message operation at step S407 in FIG. 4 as well as processing for sending this mail. It should be noted that mail creation processing for a case where received mail is edited/replied to or forwarded in the receive mail operation also is implemented by the processing shown in FIGS. 6A and 6B.

The processing for creating a new mail message is initiated in response to designation of "NEW MAIL MESSAGE" operation by the user. According to this processing, an initial screen for creation of a new mail message is displayed on the display unit of the operation panel 106. The destination, subject and text are displayed on this screen (step S601). If this processing is executed in response to the new mail message operation, then "DESTINATION", "SUBJECT" and "TEXT" will all be blank. If the initial screen display is from "EDIT/REPLY" (step S508) in the receive mail operation performed by the user, then the sender of the received mail that is to be replied to is copied to "DESTINATION", the subject of this received is copied to "SUBJECT", and the text of the received mail is copied to "TEXT". If the initial screen display is from "FORWARD" (step S509), then the subject of the received mail is copied to "SUBJECT" and the text of the received mail is copied to "TEXT"."DESTINATION" is blank.

Under these conditions, a cursor "→" being displayed on the display unit is moved to the desired item by pressing "↑" and "↓" keys provided on the operation panel 106. Destination, subject, text, send and save are available as items that can be selected.

If a "SET" key on the operation panel 106 is pressed when the arrow cursor is situated at "DESTINATION", control proceeds to step S604 through the steps S602, S603, whereby a transition is made to destination input processing.

The methods available for entry of destination are entry of characters using numeric keys and entry by making a selection from a telephone directory to which E-mail address information has been added in the manner shown in FIG. 2 (step S604).

If entry by telephone directory has been selected at step S604, entry by telephone directory is judged at step S605 and control proceeds to step S606. Processing for selecting E-mail from the telephone directory is initiated and a search of the telephone directory is conducted at step S606. The details of processing for selecting E-mail addresses from the telephone directory will be described later with reference to FIG. 7. A plurality of E-mail addresses can be registered in a single item of destination data in the telephone directory. Multiple addresses can be designated by a single destination input with regard to destination data in which a plurality of E-mail addresses have been registered.

Figure 8A:
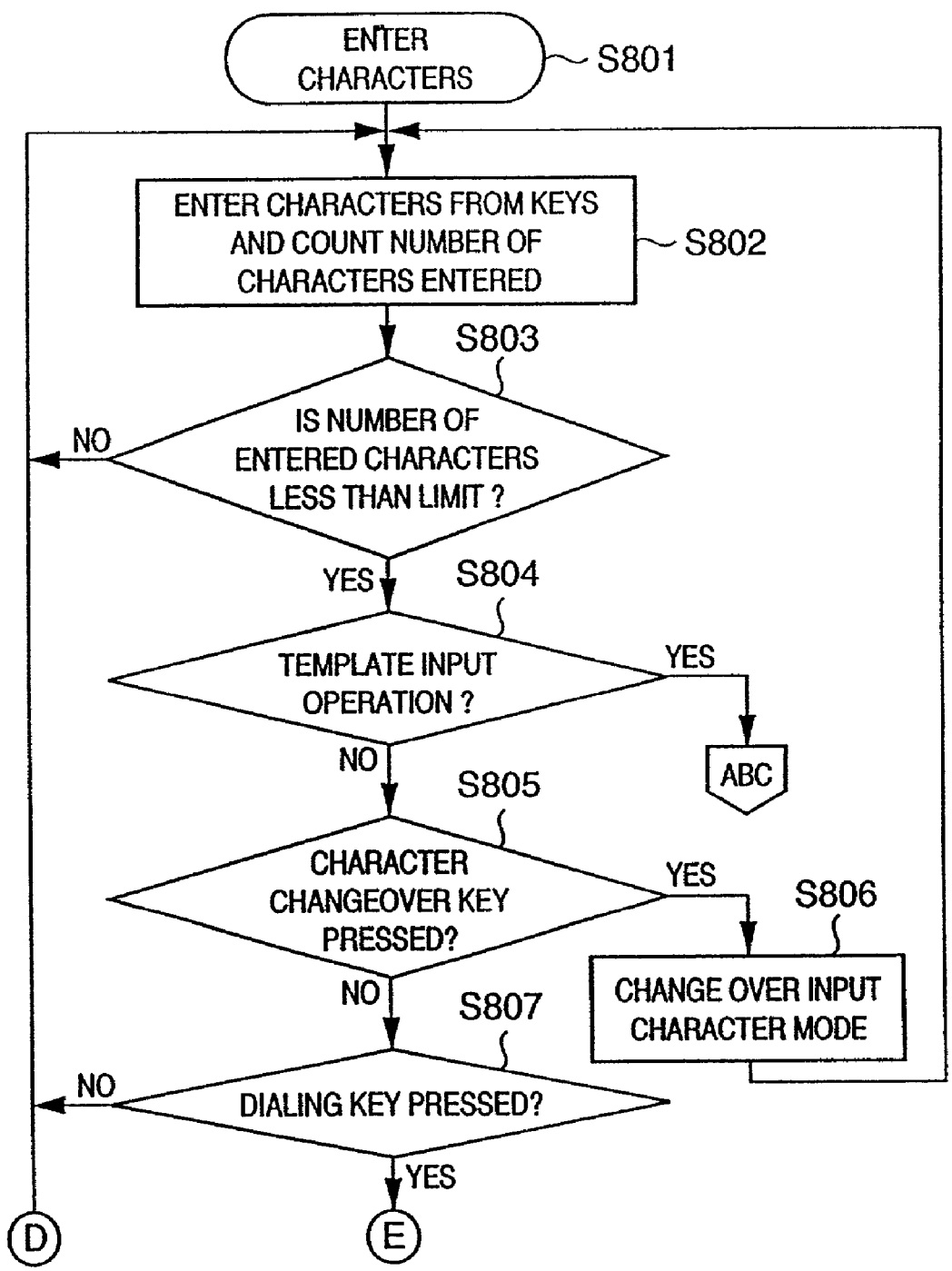

If entry of a destination address by dialing buttons has been selected at step S604, it is determined at step S605 that an entry will not be made from the telephone directory. Control then proceeds to step S607, at which a template table for destination input is set. Character input processing is then executed at step S608. The details of character input processing are as shown in FIGS. 8A and 8B, and the details thereof will be described later.

The template table set at step S607 includes ".co.jp", ".ne.jp", ".com" and ".ac.jp", etc. The candidates are displayed by a "FUNCTION" key and can be selected using inputs from the "↑" and "≡" keys. If processing for entering characters at step S608 is completed, the content is finalized by the "SET" key at step S609.

If the destination is finalized by the "SET" key at step S609, control proceeds to step S611 to restore the display for creating a new mail message.

Next, if pressing of the "SET" key is detected (step S612) with the arrow cursor situated at "SUBJECT" (step S611), a transition is made to processing for entering the subject (step S613). In subject input processing, a template table for subject input is set (step S614) and a transition is made to the character input processing of FIGS. 8A and 8B (step S615).

Items such as "TODAY'S SCHEDULE", "GREETINGS" and "MATTERS TO COMMUNICATE" have been registered in the template table for subject input set at step S614. The candidates are displayed by the "FUNCTION" key and the desired template can be selected using inputs from the "↑" and "↓" keys. When the character input processing at step S615 is completed, the content is finalized by the "SET" key (step S616). If the subject is finalized by the "SET" key at step S616, control returns to the display for creating a new mail message (step S617).

Next, if pressing of the "SET" key is detected (step S618) with the arrow cursor situated at "TEXT" (step S617), a transition is made to processing for entering text (step S619). In text input processing, a template table for text input is set (step S620) and a transition is made to the character input processing of FIGS. 8A and 8B (step S621).

The template table for text input set at step S620 contains items such as "HI!", "TELEPHONE ME" and "TODAY IS A HOLIDAY". The candidates are displayed by the "FUNCTION" key and can be selected using inputs from the "↑" and "↓" keys. When the character input processing at step S621 is completed, the content is finalized by the "SET" key (step S622). If the text is finalized by the "SET" key at step S622, control returns to the display for creating a new mail message (step S623).

If pressing of the "SET" key is detected (step S624) with the arrow cursor situated at "SEND" (step S623), the fact that destination information has been registered is checked and transmission of E-mail starts (step S625). The details of processing for sending E-mail will be described later with reference to FIG. 10.

If pressing of the "SET" key is detected (step S627) with the arrow cursor situated at "SAVE" (step S626), the fact that destination, subject and text have been registered is checked, the E-mail information is saved and this information is displayed in list form together with E-mail information saved in the past (step S628).

Figure 7:
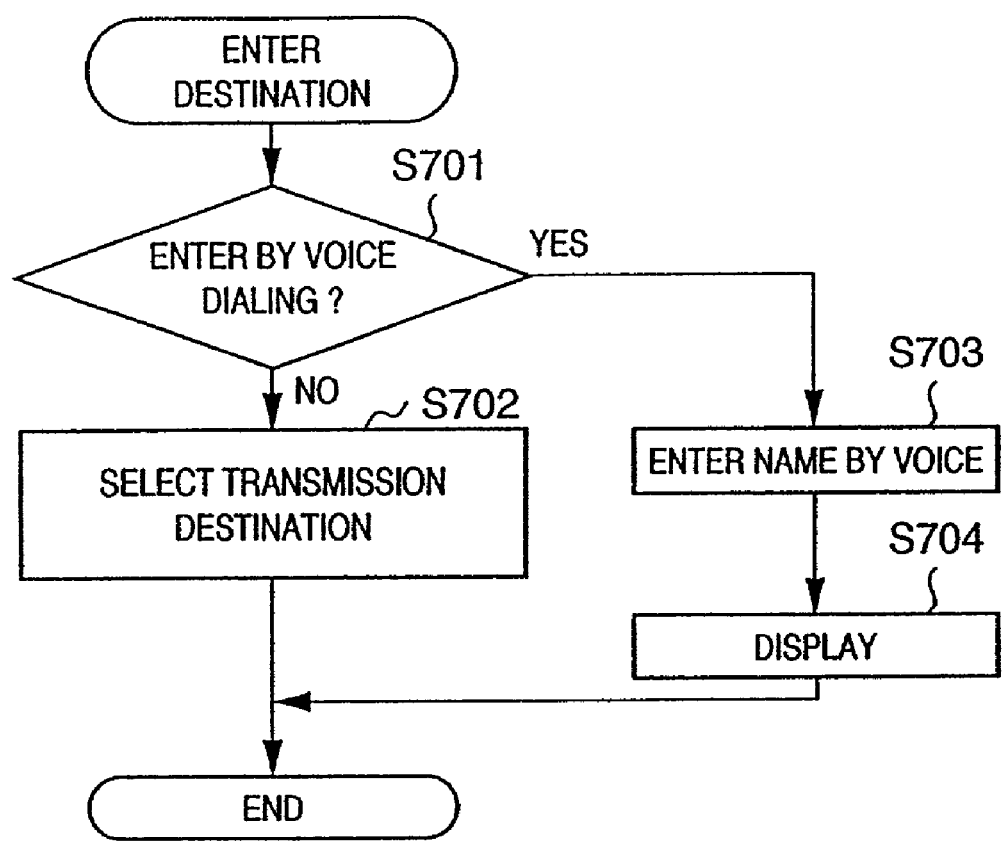
FIG. 7 is a flowchart illustrating processing for selecting an E-mail address from a directory according to this embodiment.

FIG. 7 is a flowchart illustrating processing for selecting E-mail from the telephone directory at step S606 in FIG. 6B.

Processing branches at step S701 depending upon whether a search of the telephone directory is conducted by voice recognition (voice dialing). If search processing based upon voice dialing is not executed, i.e., if a "TELEPHONE DIRECTORY" key on the operation panel 106 has been pressed, control proceeds to step S702. Here contact names, for example, in the destination data 401 are displayed and a transmission destination is selected from the telephone directory by operating a predetermined key (by performing a scrolling operation or designating operation). The E-mail address that has been registered in the destination data of the designated transmission destination is acquired.

On the other hand, if a "VOICE DIALING" key is pressed at step S701, control proceeds to step S703 to acquire an E-mail address from the telephone directory by voice dialing. If the name of a contact is entered by voice at step S703, the transmission destination deemed to be appropriate as a result of voice recognition is displayed at step S704. When a search is conducted by voice recognition, priority is given to retrieval of contacts having E-mail addresses. Adopting this expedient makes it easier to select contacts having E-mail addresses and raises recognition rate as well. Further, if it is so arranged that contacts not having E-mail addresses are not retrieved, the speed of processing for a search-recognition search increases.

FIGS. 8A and 8B are flowcharts illustrating the details of character input processing (step S608) in destination input processing of FIG. 6, character input processing (step S615) in subject input processing, or character input processing (step S621) in text input processing.

This control has the function of a front-end processor (referred to as "FEP" below), which functions as part of an editor for performing character input.

Character input of the FEP starts at step S801. This is followed by step S802, at which the user enters characters from keys on the operation panel 106 and the number of entered characters is counted if the characters are entered validly. Next, at step S803, the number of validly entered characters is checked after the entry of characters starts. If characters validly entered exceed a number of characters constituting an input limit of the FEP, control returns from step S803 to step S802 and the characters that were entered in excess of the limit are discarded. If the number of entered characters is less than the input limit ("YES" at step S803), then control proceeds to step S804.

Next, it is determined at step S804 whether the key operation performed at step S802 is a template input operation. If the decision rendered is "YES", control proceeds from step S804 to step S903 in FIG. 9. The details of operation related to the template input operation and processing will be described later with reference to FIG. 9. If an operation for entering a template has not been performed ("NO" at step S804), control proceeds from step S804 to step S805.

It is determined at step S805 whether a character changeover key has been pressed. If the key has been pressed, control proceeds to step S806. Here the input character mode is changed over and control returns to step S802. Changeover of the input characters signifies mode changeover among an "ALPHANUMERIC MODE", "HIRAGANA MODE", etc. If it is found at step S805 that the character changeover key has not been has not been pressed, control proceeds to step S807, where it is determined whether the key input at step S802 was that of a dialing key. If the decision rendered is "YES", then control proceeds to step S808 so that a character input operation may be carried out.

On the other hand, if the key input was not that of a dialing key ("NO" at step S807), then control returns to the beginning (step S802) of the flowchart. If the key input was not that of a dialing key, the input may have been from a "CLEAR" key or "MOVE CURSOR" key, by way of example. In this embodiment, such key operation need not be described.

At step S808, control branches to whichever character input mode has been selected. The character input mode is decided from a character table assigned to dialing keys and the number of times the keys are pressed. The input operation itself is a well-known method in which, basically, characters are entered on a telephone or the like having dialing keys.

It is determined at step S808 whether the mode is the input character mode. In changeover of the input character mode, a changeover is made among an "ALPHANUMERIC" mode, a "NUMERIC" mode, a "HIRAGANA" mode and a "KATAKANA" mode in response to a specific key input from the operation panel 106, as illustrated at steps S805, S806. At step S808, control branches to processing using each of the character input tables in accordance with the input character mode to which the changeover has been made by the above-described changeover operation.

Processing of each character input table will now be described. If the mode selected at step S806 is the "ALPHANUMERIC" mode, then processing for entering alphanumeric characters is executed at steps S809 to S811.

By way of example, a case where the dialing key pressed at step S802 is the "1" key will be described. This embodiment is such that until entry of "@" is finalized in the alphanumeric mode, priority is given to @ and the character input table indicated at step S810 is used. In the alphanumeric mode, therefore, first "@", which is the leading character in the character table (@ priority—step S801) that has been assigned to the dialing key "1", is selected as a character candidate. If the dialing key "1" is pressed again, then ".", which is the second character in the character table, is selected as the character candidate. If the same dialing key continues to be pressed without the character input mode being changed, character candidates that have been assigned to the dialing key "1" are selected in order. When one circuit of character candidates of one dialing key has been completed, the leading character of the character table is again selected as the character candidate. Finalization of a selected character happens when an "ENTER" key is pressed, when a character changeover key is pressed to change over the input character mode, or when some other key is pressed.

Next, if another dialing key, say the dialing key "2", is pressed in the same mode, then "a" assigned to the dialing key "2" is selected as the character candidate. When this is done, the character candidate that was selected by the dialing key "1" is finalized. In other words, if first the dialing key "1" is pressed to make "@" the candidate and then the dialing key "2" is pressed to select "a" as the candidate, then the character string "@a" will be entered as the input characters of the FEP.

Next, if the dialing key "1" is pressed again in the same mode, one loop of the flowchart is traversed and then, after processing branches to the alphanumeric mode at step S808, it is judged at step S809 that entry of "@" has been completed. Control therefore proceeds to step S811, the character table assigned to the dialing key "1" is made a dot priority table, ".", which is the leading character of this table, is selected initially as the character candidate, and "@." are entered as the input characters of the FEP.

Thus, once "@", which is the candidate of the dialing key "1", has been entered and finalized as a character, the character candidate of dialing key "1" regarding subsequent input characters is selected based upon the character table for which "." has a higher priority than that of "@". Generally, in an E-mail address, there are many occasions where "." is entered after "@". In addition, "." is entered several times whereas "@" need be entered only once. Accordingly, operability is improved by establishing the former mode, in which @ takes priority, until "@" is entered, and then establishing the latter mode, in which "." takes priority, after "@" is entered.

Next, if the mode selected at step S808 is the numeric mode, input processing in the numeric mode is executed at step S812. If the dialing key entered at step S802 is the "1" key, then, in the numeric mode, "1", which is the character that has been assigned to the dialing key "1", is selected as the character candidate. If the same dialing key continues to be pressed in a case where the character input mode is not changed, numerals "1111" are entered in succession.

Next, if the mode selected at step S808 is the hiragana mode, input processing in the hiragana mode is executed at step S813. For example, if dialing key pressed at step S802 is "1", then, in the hiragana mode, first (Ç†), which is the leading character in the character table that has been assigned to the dialing key "1", is selected as a character candidate. If the dialing key "1", is pressed again, then "Ç¢", which is the second character in the character table, is selected as the character candidate. If the same dialing key continues to be pressed in a case where the character input mode is not changed, character candidates that have been assigned to the dialing key "1" are selected in order. When one circuit of character candidates of one dialing key has been completed, the leading character of the character table is again selected as the character candidate.

Next, if another dialing key, say the dialing key "2", is pressed in the same mode, then "ÇŒ" assigned to the dialing key "2" is selected as the character candidate.

If the katakana mode has been selected as the input character mode, then control branches from step S808 to step S814, where katakana characters are selected and entered in a manner similar to that of the hiragana mode described at step S813.

Whenever one character is entered, it is determined at step S815 whether the entry of characters is finished. If the user has performed an operation indicating end of character input ("YES" at step S815), control proceeds from step S815 to step S816. Here the character input operation by the FEP is terminated and the entered character string is sent back to a module such as the editor that originally called the FEP.

If the user has not performed an operation indicating end of character input ("NO" at step S815), then control returns to step S802. Control proceeds to character input processing of the FEP again. Thus, it is possible to carry out character input by an FEP.

Figure 9:
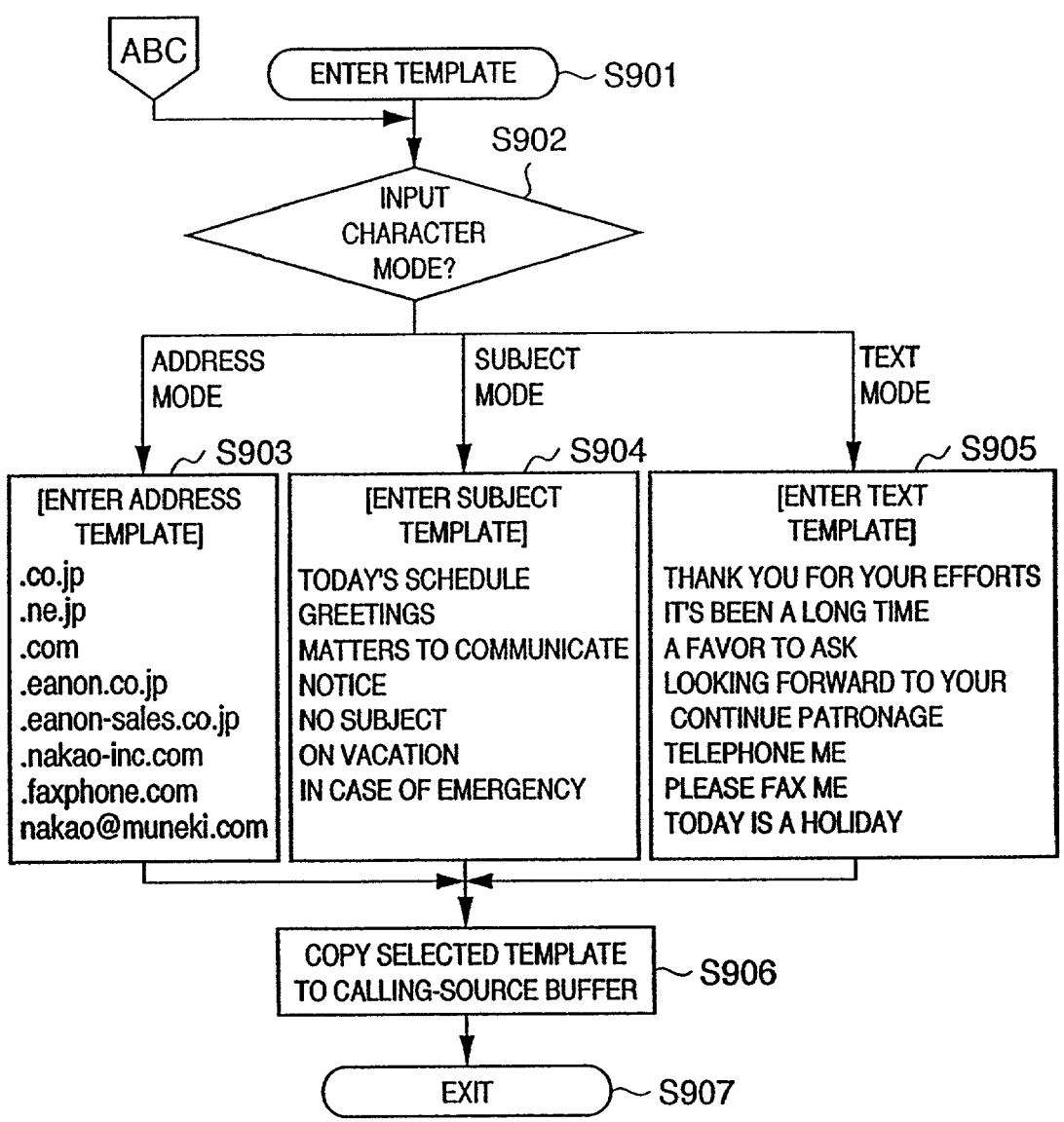
FIG. 9 is a flowchart illustrating processing for entering a template according to this embodiment.

FIG. 9 is a flowchart of template input processing executed in a case where it was determined at step S804 that the key operation was a template input operation.

First, template input processing is started at step S901, then the input processing mode is discriminated at step S902. Input processing modes are a destination (address) mode, a subject mode and a text mode, as described in connection with FIG. 6. This decision is for determining, by a variable that can be referenced externally, what the present input mode of the apparatus is (i.e, which of steps S608, S615, S621 is currently being executed).

In the address mode, it becomes possible to enter alphanumeric characters used in an E-mail address. Further, in the subject mode and text mode, it becomes possible to enter alphanumeric characters, hiragana characters, katakana characters and Chinese characters.

If it is determined at step S902 that the input processing mode for entering a template is the address mode, then a transition is made to address template input processing at step S903. Here all or part of an address can be selected from a list of the template table. The table list is displayed on the display unit LCD of the operation panel 106 in FIG. 1 and any template can be selected by key operation. It should be noted that the template table is not limited to one fixed by the apparatus; a template table can be registered later at the will of the user.

After selection of a template is made by the key operation, the template selected at step S906 is copied to a buffer of the calling source. Processing is then exited at step S907.

If it is determined at step S902 that the input processing mode for entering a template is the subject mode, then a transition is made to subject template input processing at step S904. Here the desired template is selected from the list of the subject template table in a manner similar to that of step S903 and this is stored in the buffer of the source that called this processing.

If it is determined at step S902 that the input processing mode for entering a template is the subject mode, then a transition is made to subject template input processing at step S905. Here the desired template is selected from the list of the text template table in a manner similar to that of step S903 and this is stored in the buffer of the source that called this processing. Thus, processing for template input called from the FEP is executed.

Figure 10:
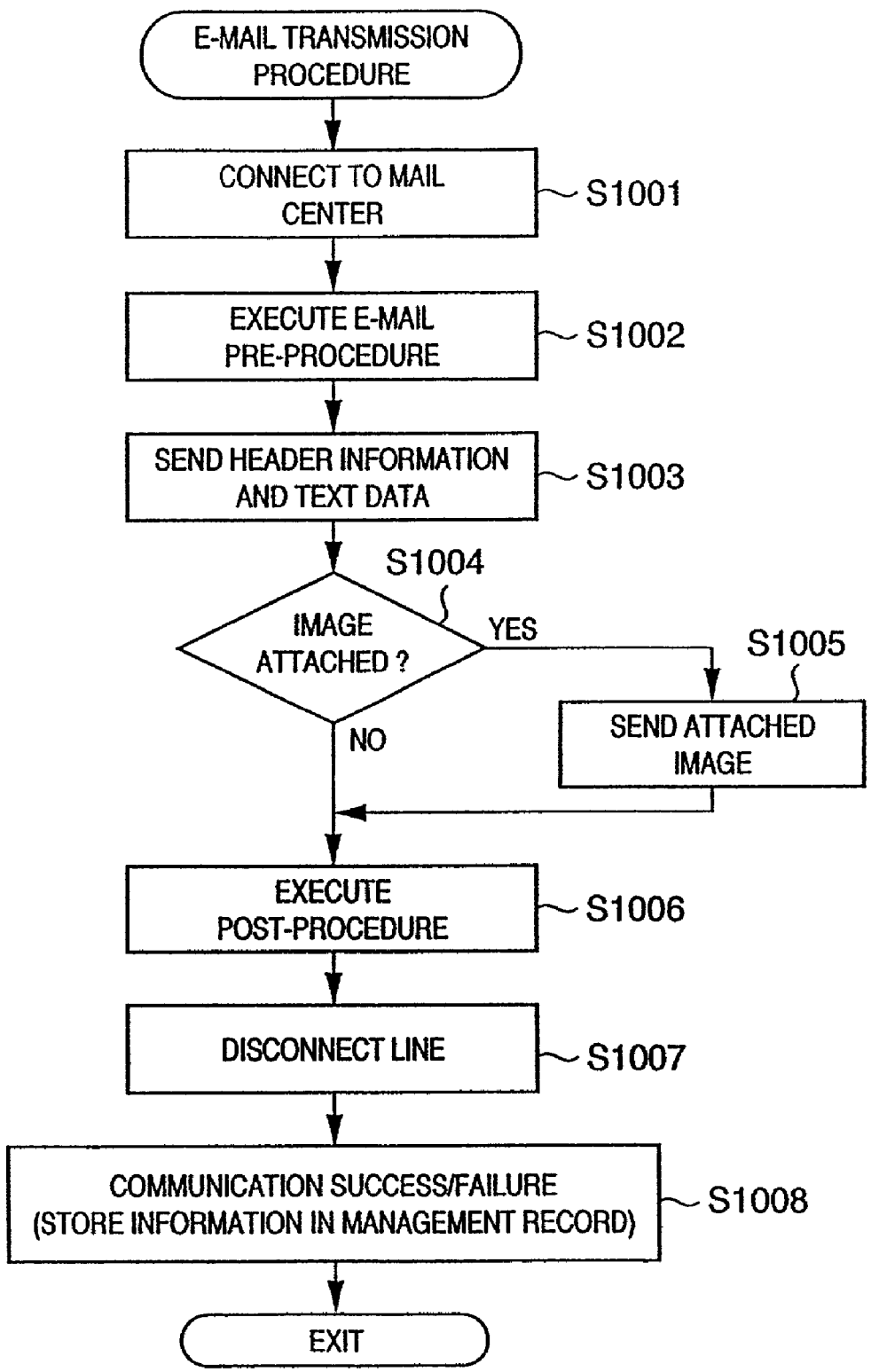
FIG. 10 is a flowchart illustrating processing for sending E-mail according to this embodiment.

Transmission processing executed at step S625 will be described next. FIG. 10 is a flowchart for describing E-mail transmission processing executed at step S625.

In order to connect to an E-mail server at step S1001, a line is acquired and the E-mail server is called. This procedure is in accordance with the specifications of individual carriers that provide the E-mail service. Each procedure (protocol) differs depending upon the carrier. However, since the procedure has no direct bearing upon the essence of the present invention, it will be described only in conceptually.

If a connection is made to the mail center at step S1001, a pre-procedure (authentication, etc.) for E-mail is executed (step S1002). This procedure employs a modulation scheme designated by the carrier.

After the success of the E-mail pre-procedure, header information specific to the mail per se and text data are transmitted to the E-mail server center in a predetermined format (step S1003). It is then determined at step S1004 whether there is an attached image. If the decision rendered is "YES", then control proceeds to a phase for transmitting the attached image (step S1005). When transmission of the attached image ends, a post-procedure is executed at step S1006 and the telephone line connected to the E-mail server is disconnected at step S1007. The status of the mail record area is changed in accordance with the success/failure circumstances of the procedure (step S1008).

By virtue of the mail record data, mail that could not be transmitted can be discriminated by the terminal when perusal of outgoing mail is executed. In this embodiment, the specifications are such that a "MAIL SENT" decision is rendered if the transmission of the attached image on the side of the mail server is completed without difficulty. However, detailed management may be performed by splitting the decision between success or failure of transmission of the main body text and success or failure of transmission of the attached image.

[4.3 Send Mail Operation]

If the "SEND MAIL" operation is specified, a send-mail list display is presented to display the number of mail items saved as outgoing mail as well as the subjects of the outgoing mail. The user selects the outgoing mail from the displayed list and can "BROWSE", "PRINT", "EDIT/SEND" and "DELETE" outgoing mail.

Figure 11:
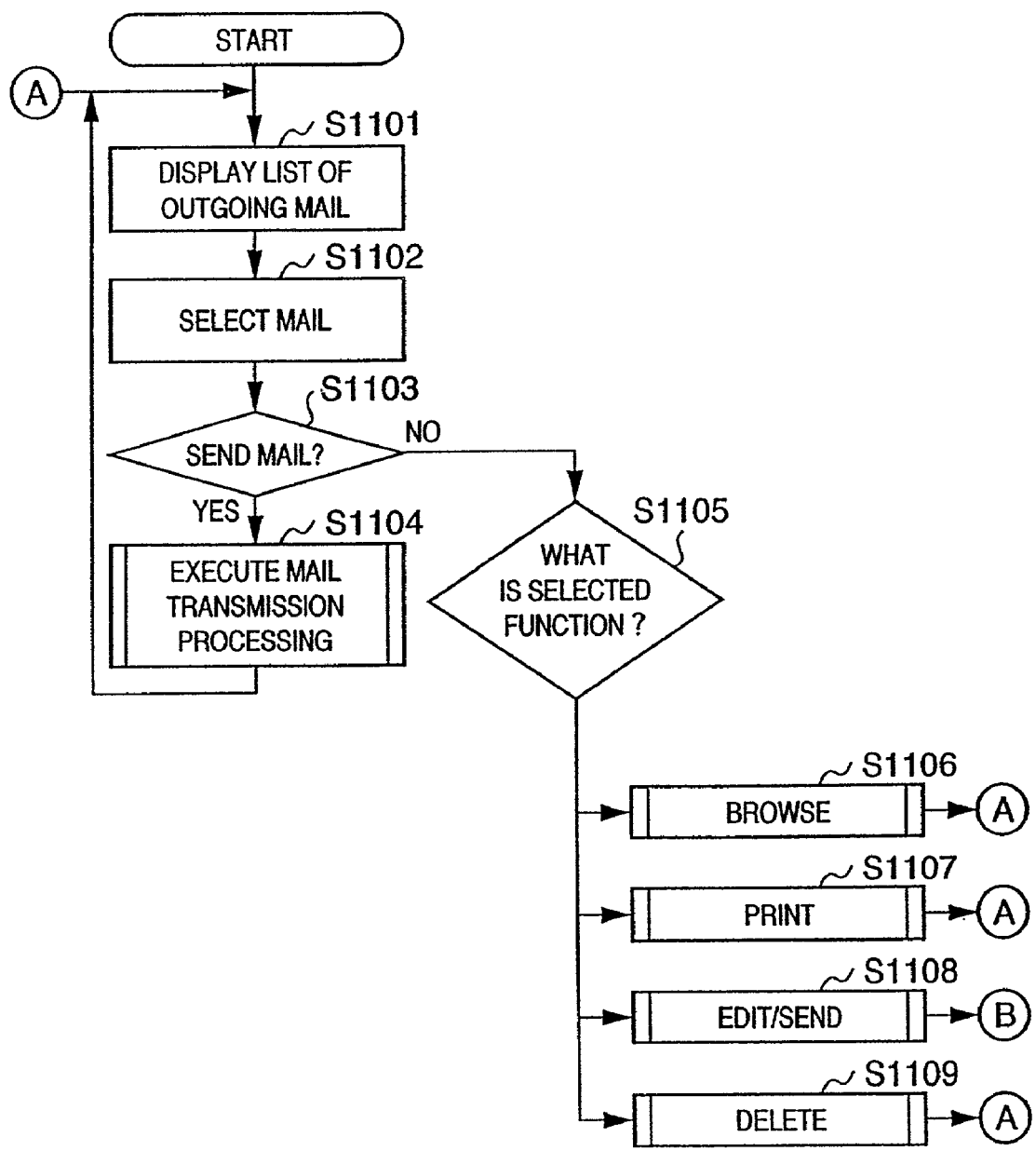
FIG. 11 is a flowchart illustrating processing for a send-mail operation according to this embodiment.

FIG. 11 is a flowchart for describing the content of the send mail operation according to this embodiment. A list of outgoing mail saved in memory is displayed at step S1101. This is a display of a list of outgoing mail that was saved in memory at step S628 in the above-described processing for creating a new mail message. It is also permissible to present the display in such a manner that success or failure of transmission can be distinguished. Next, at step S1102, desired outgoing mail is selected from the list. It is determined at step S1103 whether the outgoing mail selected at step S1102 has been designated for transmission processing.

If transmission processing has been designated ("YES" at step S1103), control proceeds to step S1104, where the outgoing mail selected at step S1102 is transmitted in accordance with the transmission procedure described above in connection with FIG. 10. Control then returns to step S1101.

If processing other than transmission processing has been designated ("NO" at step S1103), control proceeds to step S1105. Here processing branches in accordance with the processing designated with regard to the outgoing mail. In the facsimile machine according to this embodiment, "BROWSE", "PRINT", "EDIT/SEND" and "DELETE" are included as selectable functions.

If "BROWSE" has been designated at step S1105, control proceeds to step S1106, where the outgoing mail selected at step S1102 is displayed on the display unit of the operation panel 106. If end of browsing is designated, control returns to step S1101. If "PRINT" is has been designated at step S1105, control proceeds to step S1107, at which the selected outgoing mail is printed out. When printing ends, control returns to step S1101.

If "EDIT/SEND" has been designated at step S1105, an editor is started up at step S1108 to edit and/or send the selected outgoing mail. In this case, the processing for creating a new mail message described in FIG. 6 is executed and the "DESTINATION", "SUBJECT" and "TEXT" that have been set in the selected outgoing mail are copied.

If "DELETE" is selected at step S1105, control proceeds to step S1109, where the outgoing mail selected at step S1102 is deleted from memory. Control then returns to step S1101, where the list of outgoing mail is displayed.

[4-4. Operation Quit Processing]

Figure 13:
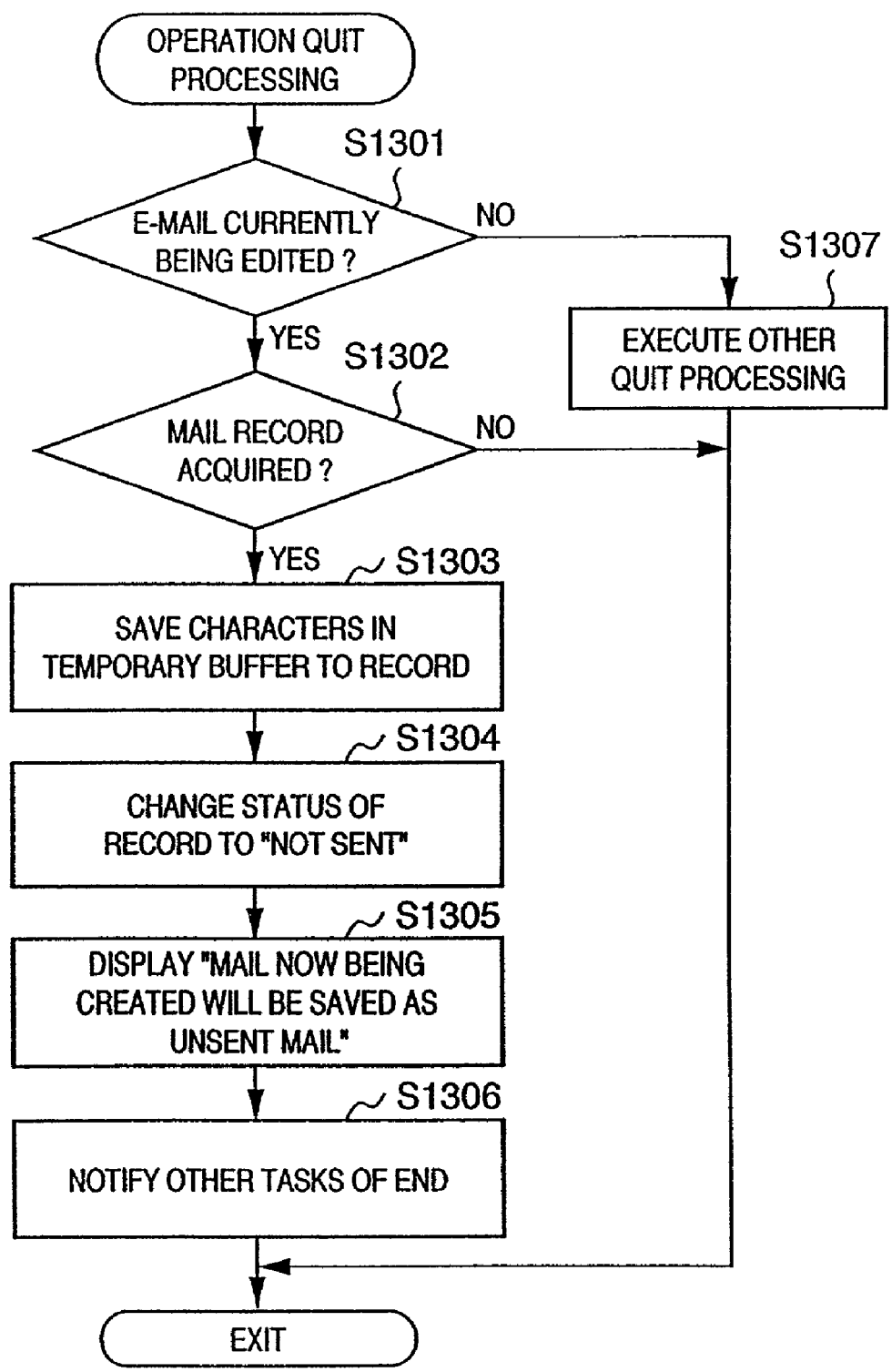
FIG. 13 is a flowchart illustrating processing for quitting E-mail according to this embodiment.

FIG. 13 is a flowchart illustrating the details of the quit processing step (step S408) in the flow of overall operation of E-mail shown in FIG. 4.

It is determined at step S1301 whether editing of E-mail is in progress. If E-mail is not being edited ("NO" at step S1301), then other quit processing is executed at step S1307. This is outside the scope of the present invention and need not be described.

If it is found that editing of E-mail is in progress ("YES" at step S1301), then it is determined at step S1302 whether the mail record of this E-mail has already been acquired. If the answer is "NO", then processing ends. If the record has been acquired ("YES" at step S1302), then the "ADDRESS", "SUBJECT" and "TEXT", etc., which constitute the entered content indicated in FIG. 6, are saved in the mail record or saved in a form linked to the record (step S1303). Furthermore, the fact that mail has not been sent is saved in the mail record as status (step S1304). It should be noted that since status is saved as "SENT" when send processing ends, the assignment "UNSENT" may be made if there is no change in status.

Next, since creation of mail will suddenly be suspended, a message "MAIL NOW BEING CREATED WILL BE SAVED AS UNSENT MAIL" is displayed on the display panel (step S1305) to prevent the user from performing an erroneous operation or executing suspend processing because of undue anxiety. Finally, processing is exited after a message to the effect that the operating task will end is sent to other line tasks, etc. (step S1306). This exit message is indicated at T-m3 (described later) in FIG. 14.

Figure 14:
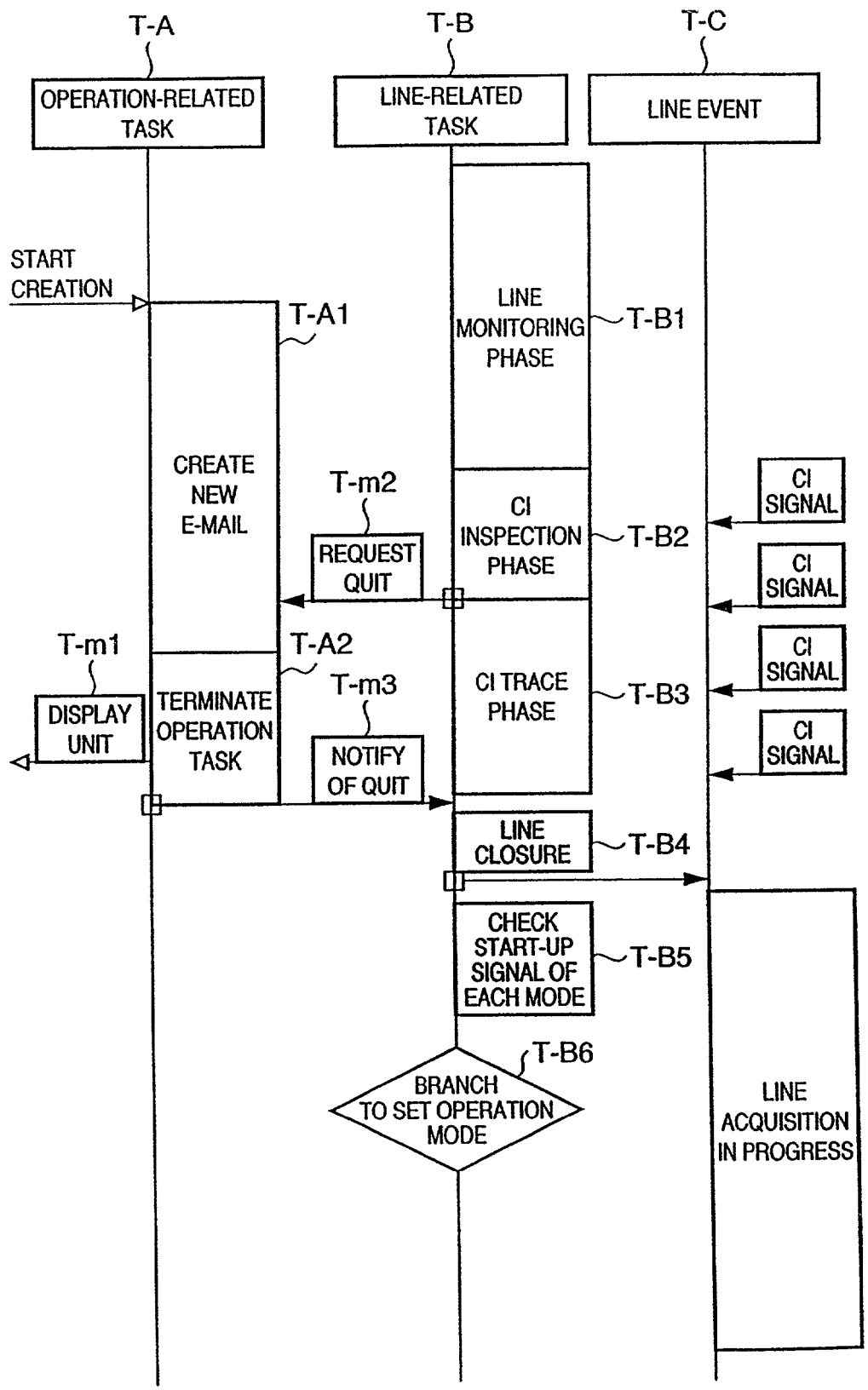
FIG. 14 is a diagram illustrating an operation quit sequence according to this embodiment.

FIG. 14 is a diagram illustrating the operating status of operation-related tasks and line-related tasks when mail creation is suspended during the creation of E-mail and when there is an incoming E-mail response.

In FIG. 14, T-A represents the status of operation-related tasks, T-B represents the status of tasks for monitoring line events and for performing line control, and T-C represents the signals on a line and the state of closure. Time elapses from top down in FIG. 14.

Under ordinary standby conditions, the line-related task monitors a line in permanent fashion (T-B1). If the user creates E-mail by input from the operation panel (T-A1), the operation-related task executes processing with regard to the operation for creating mail. Meanwhile, the line-related task continues to monitor the line (T-B1). If a CI signal arrives through the line from an exchange, CI sensing means in the NCU 108 of the facsimile machine shown in FIG. 1 senses the CI signal. Whether the CI signal is a prescribed frequency, whether it has a prescribed ON time and a prescribed OFF are sensed in the line task (T-B2; CI inspection phase). If CI signals are detected greater than a prescribed number of times within a stipulated range, the facsimile machine prepares to shift to a prescribed mode and transmits a quit-request message from the line-related task to the operation-related task (T-m2). The prescribed mode signifies an answering-service telephone mode or an FT mode, etc., and the prescribed number of times is set in advance on a modeby-mode basis.

The line-related task performs transmission of the quit-request message (T-m2) to the operation-related task and performs tracing concurrently to determine whether the CI signal turns off. If the operationrelated task receives the quit request, on the other hand, this task executes the "oPERATION QUIT PROCESSING" (FIG. 13).

Following execution of the processing shown in FIG. 13, the operation-related task transmits quit notification to the line-related task (T-m3). Upon detecting the end of the operation-related task, the line-related task performs "LINE CLOSURE" (T-B-4) and checks the required signals after closure (FAX signal, a start-up signal from the E-mail center, and a DTMF signal) (T-B5). On the basis of results obtained by checking the start-up signal at T-B5, processing branches to the required mode (response to answering service, receipt of FAX, communication with E-mail center, etc.).

<5. Automatic E-mail Reception Operation>

Figure 15:
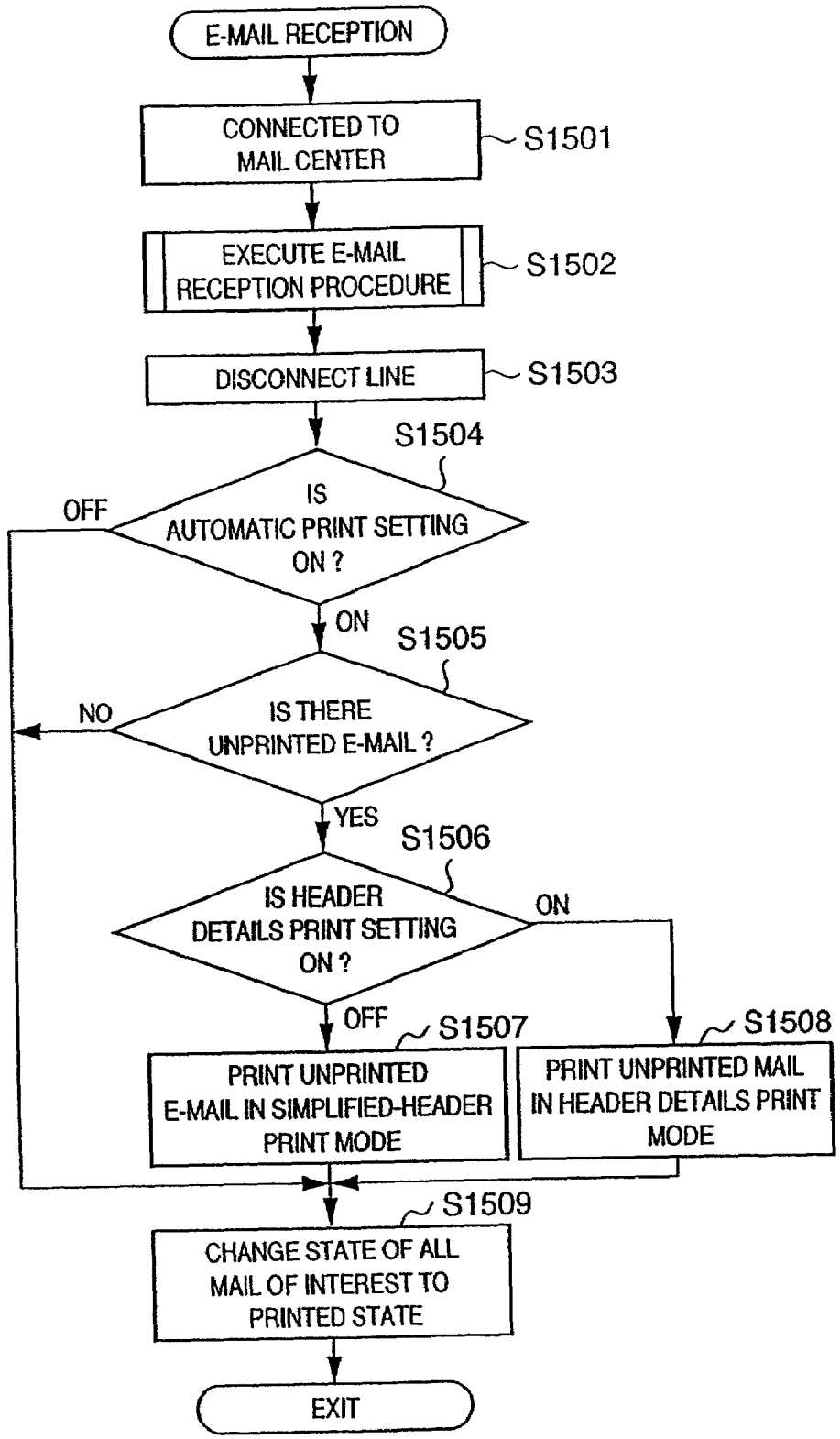
FIG. 15 is a flowchart illustrating processing for receiving E-mail automatically according to this embodiment.

The receive mail operation described above starts in response to manual selection of "RECEIVE MAIL OPERATION" by the user. However, by setting an automatic mail reception mode, the facsimile machine according to this embodiment can respond automatically to a call from the E-mail center and can receive E-mail automatically. FIG. 15 is a flowchart illustrating the details of automatic reception of E-mail according to this embodiment.

When E-mail addressed to this facsimile machine arrives at the E-mail server, the server calls the facsimile machine and the facsimile machine responds at step S1501 and makes a connection to the E-mail server. Next, at step S1502, E-mail is received from the E-mail server by the processing described in FIG. 12 and the line is disconnected at step S1503.

When automatic reception of E-mail ends, control proceeds to step S1504, where a transition is made to processing for automatic printing of E-mail. It is determined at step S1504 whether "E-MAIL AUTOMATIC PRINT" has been turned on by a setting made by the user. If "E-MAIL AUTOMATIC PRINT" is found to be "ON" at step S1504, control proceeds to step S1505, where processing for printing E-mail automatically is executed. Specifically, if the user setting "E-MAIL AUTOMATIC PRINT" is set to "ON" by the user, mail that has been received automatically can be printed automatically without intervention by the user. This makes it possible to eliminate the inconvenience of waiting for printing to take place.

It is determined at step S1505 there is E-mail that has not yet been printed. If there is no unprinted E-mail, control proceeds to step S1509. If there is unprinted E-mail, on the other hand, then control proceeds to step S1506, where it is determined whether a "HEADER DETAILS PRINT" setting in the user settings is "ON". If the setting is "OFF, control proceeds to step S1507; if it is "ON", control proceeds to step S1508. If the header details print setting is found to be OFF at step S1506, then the unprinted E-mail is printed automatically in a simplified-header print mode (step S1507). The simplified-header print mode is a mode in which the text of received E-mail and only the required items from the header of this E-mail, e.g., From, To, Subject, Date, etc., are extracted and printed. By concealing complicated information contained in the header, a printed format that is easier for the user to view can be obtained. If it is found at step S1506 that the "HEADER DETAILS PRINT" setting is ON, then the text of the received E-mail and the entirety of the header are printed (step S1508). More specifically, the mode for detailed printing of the header signifies a mode for printing all of the header information. By having the user change over the "HEADER DETAILS PRINT" setting, a print format in line with user requirements can be provided.

Next, at step S1509, all E-mail stored in the facsimile machine that is the object of the above-described print processing has its state changed to the printed state so that it will not be printed again the next time automatic reception of E-mail is performed.

Thus, by virtue of the E-mail reception processing described in connection with FIG. 15, printing can be performed in a desired header printing mode and it is possible to eliminate time during which the user waits for printing to be performed.

<6. Incoming-Call Alert Melody>

In the facsimile machine according to this embodiment, a melody can be used as a ringing tone at the time of an incoming telephone call or at the time of an incoming fax. This incoming-call alert melody may use an alert melody already build in, may employ song data, which has been entered by the facsimile machine, as the alert melody, or can use song data, which has been downloaded from the server via a communication line, as the alert melody. It is obvious that the function related to such melody data is not limited to a facsimile machine and is applicable also to a communication terminal such as a mobile telephone.

Figure 16:
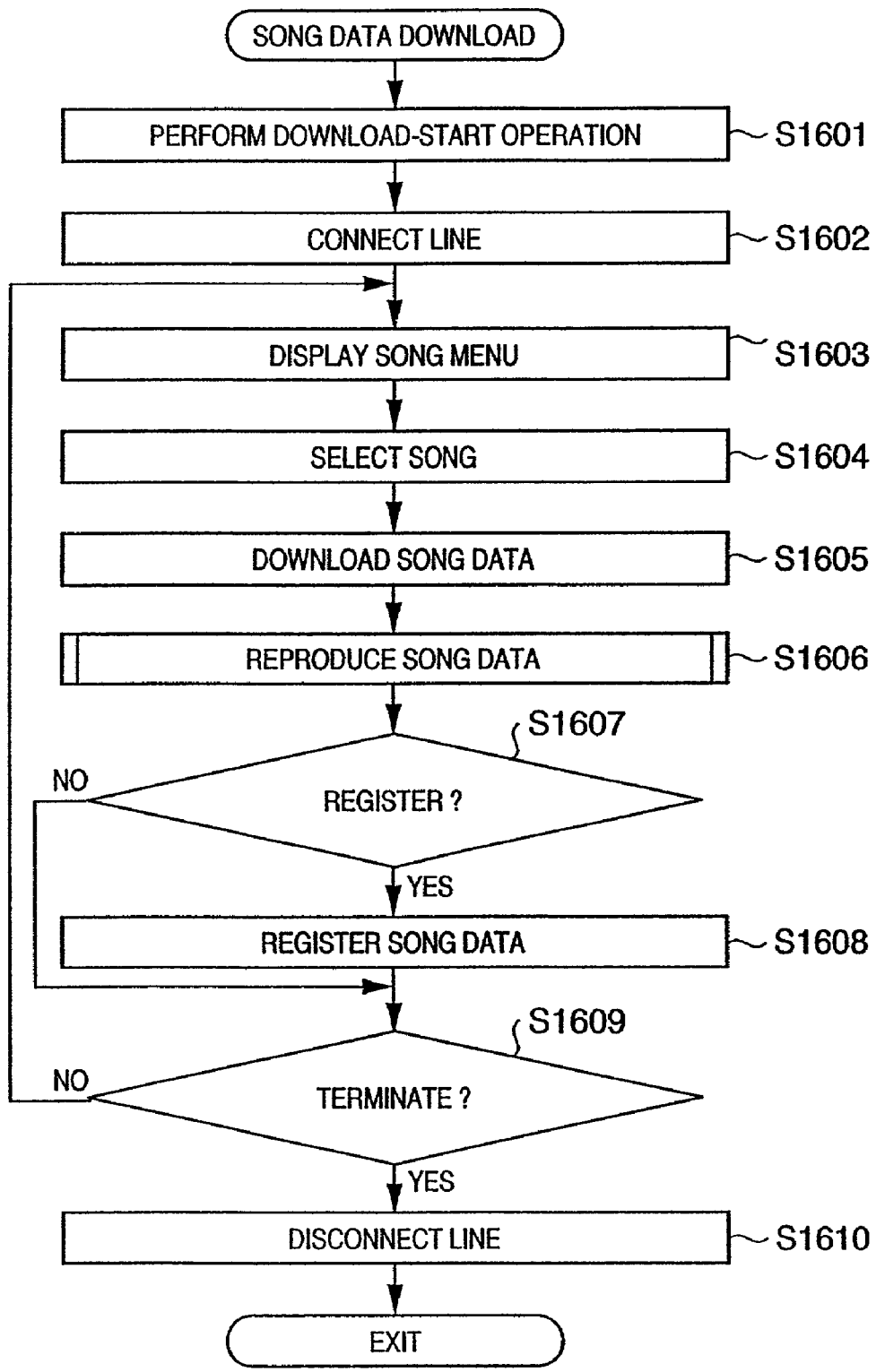
FIG. 16 is a flowchart for describing song-data download processing according to this embodiment.

FIG. 16 illustrates processing for downloading song data. The present facsimile machine is connected to a song-data download server and can download song data from the server. Processing for downloading this song data will be described with reference to FIG. 16.

When an operation for designating the start of song-data download by the user is performed via the operation panel 106 at step S1601, the cross-point switch 109 is connected to the NCU 108 at step S1602 and the song-data download server is called automatically via the NCU 108.

A song menu is received from the connected song-data download server and the received song menu is displayed on the display unit of the operation panel 106. A song selection is made by the user at the operation panel 106 at step S1604, and the song data selected by the user is downloaded from the server at step S1605.

Song data is reproduced by processing, which will be described later with reference to FIG. 17, in order that the user may decide whether or not to register the song data. The user can test-listen to the downloaded song immediately. The user is allowed to select whether the reproduced song data should be registered in the facsimile machine. If a designation is made to register the data, then control proceeds from step S1607 to step S1608, where the song data is registered in the SRAM 114 of the facsimile machine. Control then proceeds to step S1609, where the user decides whether or not to instruct the termination of download processing. On the other hand, if a designation is made not to register the song reproduced at step S1606, control proceeds directly from step S1607 to step S1609.

If the user decides not to instruct the end of download processing at step S1609, control returns to step S1603 and the above-described processing is repeated. If the end of download processing is instructed, on the other hand, control proceeds to step S1610, where the connection to the song-data download server is ended, the line is disconnected and this processing is exited.

FIG. 17 is a flowchart useful in describing processing (step S1606) for reproducing song data that has been downloaded. The MAX musical scale (high-frequency side) and MIN musical scale (low-frequency side) of the downloaded song data are detected at step A1701. It is determined at step S1702 whether the detected MAX musical scale is capable of being reproduced by the sound source 115. Control proceeds to step S1703 if reproduction is possible and to step S1704 if reproduction is not possible.

If a musical scale that cannot be reproduced is included on the high-frequency side, then the difference between the MAX musical scale of the song data and the reproducible MAX musical scale is calculated as a minus offset at step S1704. The overall musical scale of the song data is shifted toward the MIN side (low-frequency side) by an amount equivalent to the calculated minus offset at step S1705 and control then proceeds to step S1711.

On the other hand, if a musical scale that cannot be reproduced is not included on the high-frequency side, then control proceeds to step S1703. Here it is determined whether the MIN musical scale in the downloaded song data is capable of being reproduced. If reproduction is possible, then all of the song data can be reproduced. Control therefore proceeds to step S1711, where the music data is reproduced.

However, if a musical scale that cannot be reproduced is included on the low-frequency side, then control proceeds to step S1706, where the difference between the reproducible MAX musical scale and the MAX musical scale of the song data is calculated as a plus offset 1. Next, at step S1707, the difference between the reproducible MIN musical scale and the MIN musical scale of the song data is calculated as a plus offset 2. The two plus offsets are compared at step S1708 and control proceeds to step S1709 if the plus offset 1 is smaller; otherwise, control proceeds to step S1710. At step S1709, the plus offset 1, which is an amount of shift that is possible within a range for which there will be no deviation on the high-frequency side, is smaller than the plus offset 2, which is a portion that deviates on the low-frequency side. Accordingly, the overall musical scale is shifted toward the MAX side (high-frequency side) by the amount of the plus offset 1 so that there will be no deviation on the high-frequency side. Control then proceeds to step S1711. At step S1710, the plus offset 1, which is an amount of shift that is possible within a range for which there will be no deviation on the high-frequency side, is equal to or greater than the plus offset 2, which is a portion that deviates on the low-frequency side. Accordingly, the overall musical scale is shifted toward the MAX side (high-frequency side) by the amount of the deviation on the low-frequency side, i.e., by the amount of the plus offset 2. Control then proceeds to step S1711.

The downloaded song data is reproduced by the sound source 115 as is at step S1711 if this step was reached directly from step S1703. However, if step S1711 was reached from step S1709, step S1710 or step S1705, then song data that has been obtained by shifting the overall musical scale of the song within a range in which the song data on the MAX side (high-frequency side) can be reproduced is reproduced by the sound source 115 at step S1711. The sound reproduced is output from the speaker 112. It is possible that there will be an unreproducible musical scale on the MIN side (low-frequency side). In such case, however, reproduction of the song data continues while the low-frequency region is silenced.

With regard to the song data registered at step S1608 in FIG. 16, a downloaded song may be registered as is, or song data in which the musical scale has been adjusted by the processing of steps S1702 to S1710 may be registered. In other words, it may be so arranged that the original song data that has been downloaded is registered as is at step S1608. Then, when the registered song is played back at the time of an incoming telephone call or incoming fax, etc., the song-data reproduction processing shown in FIG. 17 is executed. Alternatively, it may be so arranged that in the song-data reproduction processing at step S1606, song data whose musical scale has been shifted by the processing of FIG. 17 is registered at step S1608. Then, when the song is played back at the time of an incoming telephone call or incoming fax, etc., the song data that has been shifted and registered is reproduced as is.

Considered next will be a case where the master and slave units of the facsimile machine have sound sources whose reproducible ranges differ.

A case where the sound source on the master side can reproduce only a range narrower than that reproducible by the sound source on the slave side will be described. In a case where an operation for downloading song data is performed on the master side and the downloaded song data is used by the slave unit 400, there may be no sound source that can support the song data when the song is listened to on the master side. In such case, playback can be achieved by shifting the scale of the song data at step S1606 in the manner described above. Then, when the song data is registered at step S1608, the original song data is registered.

It may be so arranged that when song data that has been registered is to be registered in the slave, the song data is transmitted to the slave at step S1608. It may be so arranged that when the slave side requests transmission of song data that has been registered in the master, the song data is transmitted to the slave. By adopting such arrangements, even song data that is reproducible on the slave side but is not completely reproducible on the master side can be listened to and checked on the impressive high-pitch side at the master.

In accordance with this embodiment, as described above, an entire song can be reproduced in a case where the song data has a dynamic range that falls within the dynamic range of the sound source 115 even if the scale is not reproducible by the sound source 115. Since the entire scale is shifted in this case, playback is accompanied by a shift in tone. However, the overall song can be ascertained. Further, even if the dynamic range of the song data does not fall within the dynamic range of the sound source, the unreproducible scale is limited solely to one side, namely the MIN side (low-frequency side), and is always reproduced on the impressive MAX side (high-frequency side), thereby making it possible to enhance the effectiveness of song-data verification.

(Other Embodiments)

The present invention can be applied to a system constituted by a plurality of devices (e.g., a host computer, interface, reader, printer, etc.) or to an apparatus comprising a single device (e.g., a copier).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the present invention as described above, an account selection operation is dispensed with in accordance with account registration status, thereby improving E-mail operability. In particular, an E-mail operation can be performed without carrying out personal authentication under certain conditions (e.g., on the condition that there is only one account). This also improves E-mail operability.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus having an E-mail function, comprising:
    a storage unit capable of storing multiple items of account information and storing authentication information in association with each item of account information;
    a selection unit adapted to select one item of account information of the plurality thereof;
    a setting unit adapted to perform authentication based upon the authentication information when an account is set up based upon an item of account information selected by said selection unit if multiple items of account information have been stored in said storage unit, and to set up an account based upon an item of account information selected by said selection unit; and
    a processing unit adapted to process related to E-mail using the account set up by said setting unit,
    wherein if only one item of account information has been stored in said storage unit, said setting unit omits authentication based upon said authentication information and sets up an account based upon this account information.

2. The apparatus according to claim 1, wherein said storage unit stores a name in association with each item of account information; and
    said selection unit selects a desired item of account information in response to designation of a name.

3. The apparatus according to claim 2, wherein said selection unit displays a list of names that have been registered in said storage unit.

4. A communication apparatus control method for controlling a communication apparatus having an E-mail function, comprising:
    a storage step of storing at least one account information in a storing unit capable of storing multiple items of account information and storing authentication information in association with each item of account information;
    a selection step of selecting one item of account information of the plurality thereof;
    a setting step of performing authentication based upon the authentication information when an account is set up based upon an item of account information selected at said selection step if multiple items of account information have been stored at said storing step, and of setting up an account based upon an item of account information selected at said selection step; and
    a processing step of executing processing related to E-mail using the account set up at said setting step,
    wherein if only one item of account information has been stored at said storage step, said setting step omits authentication based upon said authentication information and sets up an account based upon this account information.

5. The method according to claim 4, wherein said storage step stores a name in association wit each item of account information; and
    said selection step selects a desired item of account information in response to designation of a name.

6. The method according to claim 5, wherein said selection step displays a list of names that have been stored in said storing unit.

7. A storage medium storing a control program for causing a computer to execute the control method set forth in claims 4.

* * * * *

UNITED STATES PATENT AND TRADEMARK OFFICE
CERTIFICATE OF CORRECTION

| | | |
|---|---|---|
| PATENT NO. | : 7,158,249 B2 | Page 1 of 1 |
| APPLICATION NO. | : 10/075690 | |
| DATED | : January 2, 2007 | |
| INVENTOR(S) | : Naoya Watanabe | |

It is certified that error appears in the above-identified patent and that said Letters Patent is hereby corrected as shown below:

Column 10, line 62, delete " set to 'o' " and insert -- set to "O" --

Column 12, line 32, delete " set to 'o' " and insert -- set to "O" --

Column 15, line 8, delete " and '≡' " and insert -- and "↓" --

Column 21, line 34, delete " modeby-mode " and insert -- mode-by-mode --

Column 21, line 39, delete " oPERA " and insert -- OPERA --

Column 26, line 56, delete " wit " and insert -- with --

Signed and Sealed this

Twenty-eighth Day of August, 2007

JON W. DUDAS
*Director of the United States Patent and Trademark Office*